United States Patent
Murphy et al.

(10) Patent No.: US 7,729,972 B2
(45) Date of Patent: Jun. 1, 2010

(54) METHODOLOGIES AND SYSTEMS FOR TRADE EXECUTION AND RECORDKEEPING IN A FUND OF HEDGE FUNDS ENVIRONMENT

(75) Inventors: Timothy Murphy, Co. Dublin (IE); Brendan O'Regan, Co. Dublin (IE)

(73) Assignee: The Bank of New York Mellon Corporation, New York, NY (US)

(*) Notice: Subject to any disclaimer, the term of this patent is extended or adjusted under 35 U.S.C. 154(b) by 209 days.

(21) Appl. No.: 11/567,544

(22) Filed: Dec. 6, 2006

(65) Prior Publication Data

US 2008/0140547 A1 Jun. 12, 2008

(51) Int. Cl.
G06Q 40/00 (2006.01)

(52) U.S. Cl. .................................. 705/36 T
(58) Field of Classification Search ............... 705/36 T
See application file for complete search history.

(56) References Cited

U.S. PATENT DOCUMENTS

| | | | | |
|---|---|---|---|---|
| 6,161,098 A * | 12/2000 | Wallman | ............... | 705/36 T |
| 6,601,044 B1 * | 7/2003 | Wallman | ............... | 705/36 R |
| 6,687,681 B1 * | 2/2004 | Schulz et al. | ............... | 705/36 T |
| 6,996,539 B1 * | 2/2006 | Wallman | ............... | 705/36 T |
| 7,031,937 B2 * | 4/2006 | Brown et al. | ............... | 705/36 T |
| 7,110,971 B2 * | 9/2006 | Wallman | ............... | 705/36 R |
| 7,117,175 B2 * | 10/2006 | Arnott | ............... | 705/36 R |
| 7,117,176 B2 * | 10/2006 | Wallman | ............... | 705/36 R |
| 7,249,080 B1 * | 7/2007 | Hoffman et al. | ............... | 705/36 R |
| 7,552,082 B2 * | 6/2009 | Wallman | ............... | 705/37 |
| 7,668,773 B1 * | 2/2010 | Pruitt | ............... | 705/36 T |
| 2002/0059127 A1 * | 5/2002 | Brown et al. | ............... | 705/36 |
| 2003/0069821 A1 | 4/2003 | Williams | | |
| 2003/0105697 A1 * | 6/2003 | Griffin et al. | ............... | 705/36 |
| 2004/0177020 A1 * | 9/2004 | Alderman et al. | ............... | 705/36 |
| 2005/0027632 A1 * | 2/2005 | Zeitoun et al. | ............... | 705/36 |
| 2005/0027638 A1 | 2/2005 | Ng et al. | | |
| 2005/0049952 A1 * | 3/2005 | Carter | ............... | 705/36 |
| 2005/0108134 A1 * | 5/2005 | Harlow et al. | ............... | 705/36 |
| 2006/0026085 A1 * | 2/2006 | Zoric | ............... | 705/35 |
| 2006/0041489 A1 * | 2/2006 | Arnott | ............... | 705/35 |
| 2006/0080250 A1 | 4/2006 | Hansen et al. | | |
| 2006/0100955 A1 * | 5/2006 | Baldassini et al. | ............... | 705/37 |
| 2006/0271453 A1 * | 11/2006 | Landle et al. | ............... | 705/35 |
| 2007/0055599 A1 * | 3/2007 | Arnott | ............... | 705/35 |
| 2007/0078740 A1 * | 4/2007 | Landle et al. | ............... | 705/36 R |
| 2007/0118445 A1 * | 5/2007 | Hechler | ............... | 705/30 |
| 2007/0192223 A1 * | 8/2007 | Cifrese et al. | ............... | 705/36 R |

OTHER PUBLICATIONS

International Search Report and Written Opinion issued on Oct. 1, 2008 in corresponding International Application No. PCT/US07/86044.

* cited by examiner

Primary Examiner—Jagdish N Patel
Assistant Examiner—Sara Chandler
(74) Attorney, Agent, or Firm—Pillsbury Winthrop Shaw Pittman LLP

(57) ABSTRACT

A system provides automation or semi-automation of trade execution and recordkeeping services for a fund of funds, in particular, a fund of hedge funds. In providing such features for trade execution and recordkeeping, various transaction processes may be automated or semi-automated, thus, reducing an amount of human operator action and introduction of associated delay and possibility of error. Moreover, such a system may have further utility in providing access to lot-level records.

30 Claims, 9 Drawing Sheets

METHODOLOGIES AND SYSTEMS FOR TRADE EXECUTION AND RECORDKEEPING IN A FUND OF HEDGE FUNDS ENVIRONMENT

BACKGROUND OF THE INVENTION

1. Field of the Invention

The present invention relates to financial services and more particularly to automated trade execution and recordkeeping services for a fund of hedge funds.

2. Description of Related Art

Just as a mutual fund invests in a number of different securities, a fund of funds holds shares of many different funds. These Funds of Funds (FoFs) are designed to achieve greater diversification than single manager funds. Investing in FoFs can also help spread the risk of investing in private equity because such FoFs invest the capital in a variety of funds. A diversified multiple manager portfolio has the objective of lowering volatility of the total return while gaining exposure to multiple strategies. On the downside, fees on FoFs are typically higher than those on regular funds, because they include the fees charged by the underlying funds. FoFs distribute investments among a selection of private equity fund managers, who in turn invest the capital directly. The FoF manager is paid a fee for choosing different strategies and managers, becoming the "defacto" consultant for funds. In FoFs, investors in funds of funds are willing to pay two sets of fees, one to the fund-of-funds manager and another set of (usually higher) fees to the managers of the underlying funds.

A hedge fund is a private, unregulated investment fund for large investments (minimum investments typically begin at US $1 million) specializing in high risk, short term speculation on bonds, currencies, stock options and derivatives. Hedge funds trade and invest in various assets such as securities, commodities, currency, and derivatives on behalf of their investors.

While some hedge funds may pursue conservative or market-neutral strategies, many others take highly leveraged bets on directions of currency or stock movements that are not offset by a corresponding hedged position, making them more speculative and risky undertakings. Hedge funds are allowed to use aggressive strategies that are unavailable to mutual funds, including selling short, leverage, program trading, swaps, arbitrage, and derivatives because hedge funds are exempt from many of the rules and regulations governing other mutual funds. Thus, hedge funds use one or more alternative investment strategies, including hedging against market downturns, investing in asset classes such as commodities, emerging markets, private equity or distressed securities, and using return-enhancing tools such as leverage, derivatives, arbitrage and short selling.

Thus, what makes hedge funds somewhat unique is their diversity. The variety of hedge fund strategies exceeds that of a traditional mutual fund or stock broker. These strategies tend to be more niche-like in their approach and frequently, much less dependent upon the stock market for returns. Investors often prefer to invest in hedge funds because the fund managers have a direct interest in the positive performance of their funds. Hedge fund managers are compensated largely based upon how well they perform and in many cases the fund manager is also one of the key investors in the fund.

As with traditional mutual funds, investors in hedge funds pay a management fee; however, hedge funds also collect a percentage of the profits (usually 20%) as a performance fee in addition to annual management charges and initial fees. The performance fee is paid to the fund manager and refers to a certain percentage that the hedge fund charges per year over and above the management fee. As with other funds, the performance fee usually is 20% over a threshold performance (hurdle rate, e.g., a benchmark rate such as Libor or the one-year Treasury bill rate plus a spread) if any, by which the increase in the Net Asset Value (NAV), adjusted to include distributions and cash flows, exceeds the notional increase in the NAV that would have been achieved otherwise via investment elsewhere.

BRIEF SUMMARY OF THE INVENTION

Although performance fees are central to the FoF industry, their calculation is complicated and heavily regulated by the Securities Exchange Commission. Moreover, in FoF trade execution, particularly involving hedge funds, tax calculations and settlement cycle processes are extremely complicated and significantly more protracted than simple fund trades. A further issue for funds of hedge funds results from the fact that hedge fund transactions are subject to non-standard settlement cycles, e.g., because of policies of the underlying hedge funds included in a FoF and the particular transactions involved.

Accordingly, particular utility may be provided by a system that provides automation or semi-automation of trade execution and recordkeeping services for a FoF, in particular, a fund of hedge funds. In providing such features for trade execution and recordkeeping, various FoF transaction processes may be automated or semi-automated, thus, reducing an amount of human operator action and introduction of associated delay and possibility of error. Moreover, such a system may have further utility in providing access to lot-level records.

DETAILED DESCRIPTION OF THE INVENTION

Figure 1:
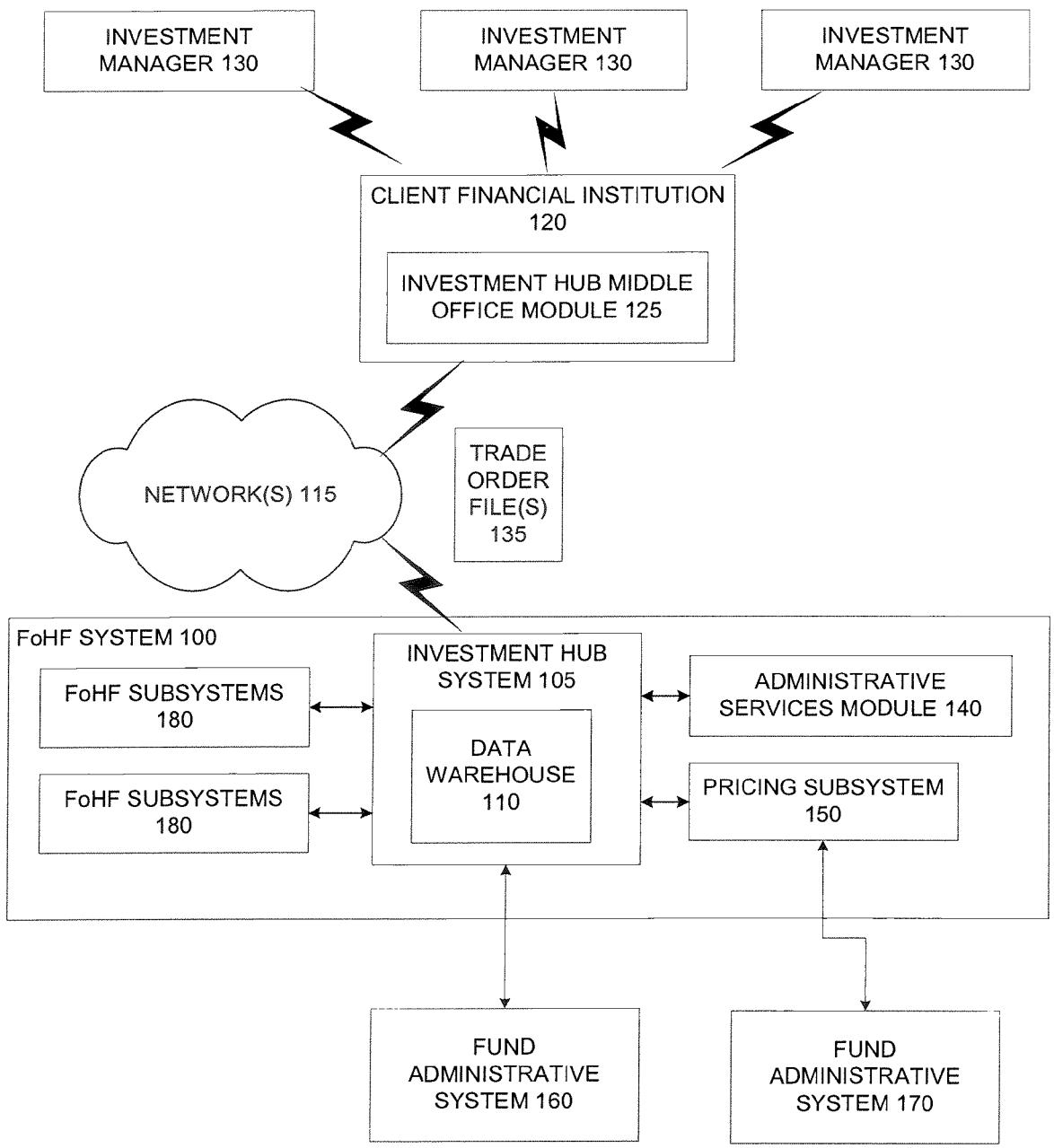
FIG. 1 illustrates an FoHF system implemented in accordance with at least one embodiment of the invention.

In accordance with at least one embodiment of the invention, a Fund of Hedge Funds (FoHF) system is provided which enable straight through processing of fund trades and other fund information with clients, fund administrators, banking institutions, and with FoHF internal systems.

In accordance with at least one embodiment of the invention, electronic trade records may be both received and created. Such electronic trade record creation and handling further enables automation, either completely or at on some significant level, to electronically reconcile trade activity and positions to third parties, such as the underlying administrator and/or transfer agent.

The FoHF system may be further configured to receive bulked trade files from a client financial institution by means of an investment hub system, handle all aspects of fund trade settlement/custody, and act as an intermediary between a client financial institution and a plurality of fund administrators and/or transfer agents servicing funds.

The investment hub system may also be configured to maintain a holdings inventory for each fund as a by-product of processing the fund trades. The lot-level inventory may show the amount currently held/settled in each fund as well as track the real-time status of all pending subscriptions and redemptions at each stage in their life cycle. The lot-level inventory information may be available online, via a browser included in the investment hub system, to authorized users. That lot-level inventory information may be accessible by both a middle office of a client financial institution and by support staff of the FoHF system.

In accordance with at least one embodiment of the invention, fund lot-level holding records may be updated directly in an investment hub system included in the FoHF system for, e.g., custody purposes, tax purposes and for the purposes of determining performance fees.

As the structure and operation of the FoHF system is described herein, it should be understood that the FoHF system may be implemented to provide either a partial or a complete FoHF outsourcing solution.

In accordance with at least one embodiment, the client financial institution maintains a relationship with the individual fund investment managers, i.e., maintains a middle office. Accordingly, under this approach, the individual fund managers need not have direct access to the investment hub system data warehouse 110 and need not submit trades directly to the FoHF system; rather access and trade submission are performed via the client financial institution.

In accordance with at least one other embodiment, the client financial institution maintains little or no direct relationship with the individual fund investment managers. Accordingly, under this approach, the individual fund managers may have direct access to the investment hub system data warehouse and submit trades directly to the FoHF system. However, in at least this embodiment of the invention, all or some of the user interfaces utilized to access and/or trade of the FoHF system, include branding of the client financial institution. Thus, a user may experience an FoHF trading experience with the understanding that the client financial institution is directly involved. Thus, the client financial institution may outsource the processing and administration associated with such trading activities while still maintaining some degree of brand presence in the market.

Thus, in one particular implementation of at least one embodiment of the invention, and as illustrated in FIG. 1, a client financial institution 120 may outsource at least some portion or all of its back office/custody fund of funds operation while retaining middle office contact with investment fund managers 130. As a result, the FoHF system 100 may include an investment hub system 105 configured to handle some or all aspects of trade settlement, maintain records of fund holdings, and act as an intermediary with fund administrators and administrative systems 160, 170.

As illustrated in FIG. 1, the FoHF system 100 includes an investment hub system 105, which utilizes a dynamic data warehouse environment that enables automation or semi-automation of trade execution in a secure solution to meet specific requirements of investment managers 130.

The investment hub system 105 may be configured to act as a central control point between various systems/parties that communicate in the FoHF system 100. Such parties may include, for example, fund investment managers 130, FoHF middle office administrators (e.g., at a client financial institution 120), fund administrators (via fund administrative systems 160 and 170, including, for example, fund portfolio accounting systems, Net Asset Valuation (NAV) systems, money transfer systems, shareholder/investor services systems, etc.). In addition to providing automated links to these various parties, the investment hub system 105 may be configured to manage the life cycle of fund transactions from initiation to final cash settlement. Thus, the investment hub system 105 may be configured to accept subscription, redemption, transfer and other fund transactions and automatically or semi-automatically prepare the appropriate application/instruction documents for fund transfer and cash movement, as explained herein.

The investment hub system 105 may include a data warehouse 110, which may be configured to maintain data that enables complete investment documentation to be created and communicated to underlying hedge funds as well as client financial institutions. To streamline data creation within or utilizing the data warehouse 110, users can avail themselves of electronic interfaces and/or generic dealing templates at the events level.

For example, for institutions that allow SWIFT messaging, the FoHF system 110 may be configured to provide the capability to generate a SWIFT message for subscriptions, redemptions and transfers. The SWIFT message may be integrated into the workflows requiring forms processing. Thus, a confirmation returned from a registrar may be done utilizing SWIFT message template MT515 (client confirmation); the SWIFT message template MT509 (order status) may be used for orders that are rejected or cancelled.

Thus, utilizing the data warehouse 110, the investment hub system 105 may generate forms/worksheets to initiate fund subscriptions/redemptions. Likewise, cash transfers may be generated automatically in, e.g., SWIFT format or by using worksheet documents generated by the investment hub system 105 as source documents for inputting the cash transfers manually into the FoHF system 100.

Under the partial outsourcing solution, the client financial institution 120 may retain a middle office operation that keeps all or at least some contact with fund investment managers 130 as well as maintaining FoHF system records. In such an implementation, the client financial institution 120 may consolidate trade orders from various investment managers 130 and then send the consolidated trades to the FoHF system by means of a standardized Trade Order File (TOF) 135 to be generated periodically, e.g., several times per day, from the client financial institution 120, as illustrated in FIG. 1.

Therefore, the client financial institution 120 may collect subscription and redemption transactions against funds in its target fund universe on behalf of its investment managers 130, pre-verify these trades, and record these transactions internally. In such an implementation, the client financial institution 120 may periodically, on an agreed upon schedule, e.g., multiple times every day, generate a file extract that may consolidate these trades by fund and then send this TOF 135 to the FoHF system 100, e.g., by File Transfer Protocol (FTP).

In consolidating trades in the TOF 135, it is possible that individual trades may not be sent day-by-day as they are received but may be accumulated by a fund administrator at the client financial institution 120 and then sent as a single consolidated trade an agreed number of days just before the fund-dealing deadline. Thus, the client financial institution 120 may hold the accumulated orders until the agreed date and then send the bulked orders to the FoHF system 100 by, e.g., FTP.

During order bulking, the client financial institution 120 may also check that minimum subscription amounts are met and also to ensure that the investment managers 130 have complied with submission dates/times. If appropriate, trades not meeting a trade acceptance criteria may be approved by the client financial institution 120 on an exception basis. If so authorized, these exception trades may be submitted along with other trades included in the TOFs 135.

Figure 2:
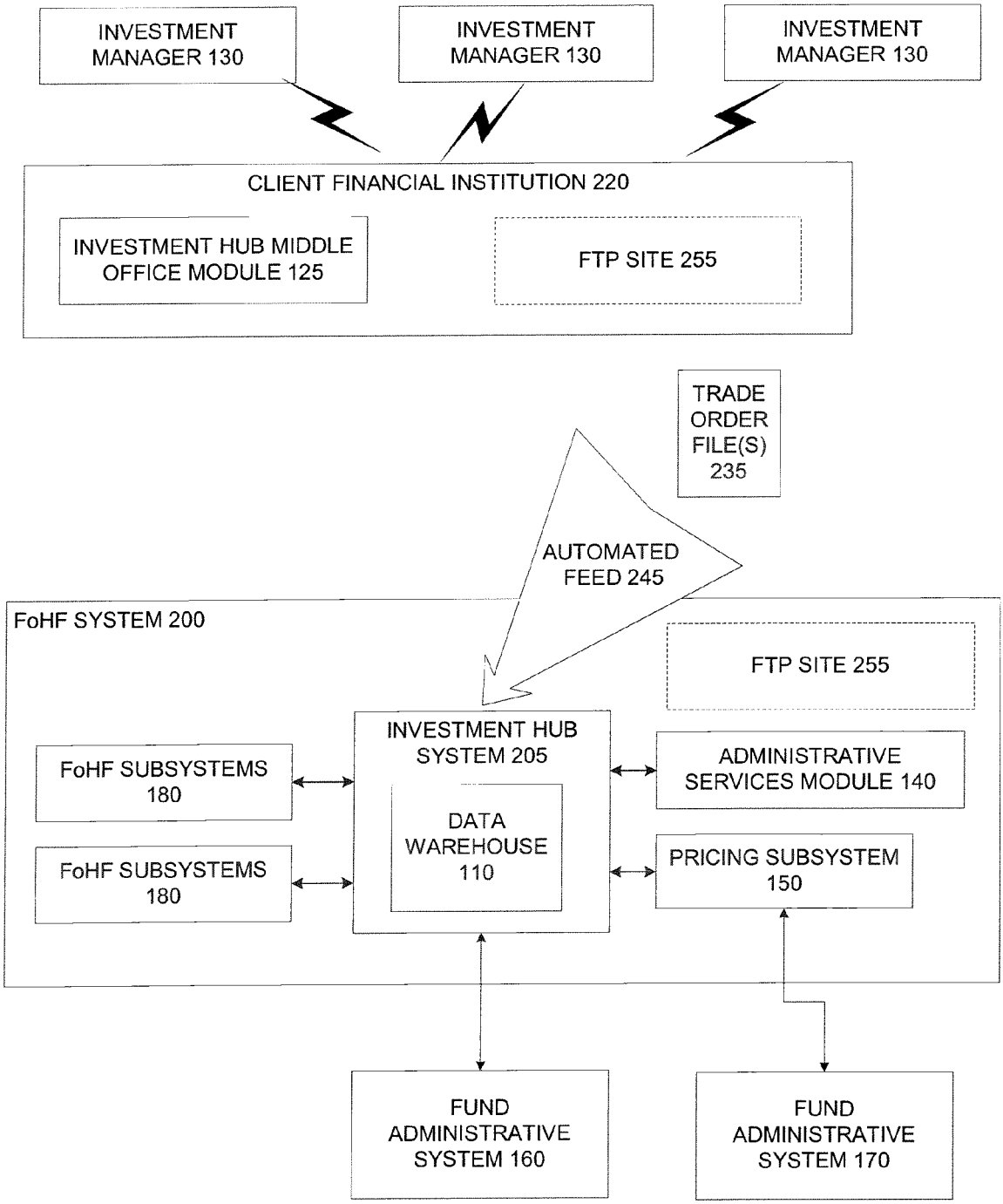
FIG. 2 illustrates an FoHF system implemented in accordance with at least another embodiment of the invention.

In accordance with at least one embodiment of the invention, as illustrated in FIG. 2, a client financial system 220 may alternatively, or in addition, send their trades to the FoHF system 200 via an automated feed 245. For example, client financial institutions 220 may transmit their TOF 235 to an FTP site 255 at their location. Alternatively, the client financial institution 220 may send the TOF 235 by FTP to a designated location 265 at the FoHF system 200. If a TOF 235 exists, then the FoHF system 200 may capture that TOF 235 for processing. Accordingly, the FoHF system 200 may regularly poll that FTP site 255, 265 to check if there are any TOFs 235 to be processed. More specifically, an investment hub system file listening component (not illustrated) may be utilized to monitor receipt of any TOF 235 and immediately initiate processing the individual trades in the TOF 235 when received. The investment hub system 205 may first attempt to identify the type of trade for each trade in the TOF 235. Once the type has been identified, the investment hub system 205 may initiate predefined workflows based upon specific trade types. In addition, any trade that cannot be minimally identified regarding type of trade, fund, or containing invalid monetary values may be directed to an exception queue for special handling.

Since the FoHF system 200 may be processing trades for multiple client financial institutions, the polling process may have the capability to accept files from multiple locations. Accordingly, the account numbers on the files received may determine the origin of the file. Receipt of the TOF 235 may be acknowledged and the trades included in the TOF 235 may automatically be entered into a relevant trade workflow process, as explained herein. The frequency of TOF 235 receipt may vary by client depending on the trading frequency of their funds.

In accordance with at least one embodiment, the investment hub system may accept only a standard TOF generated by a client financial institution. Alternatively, in at least one embodiment, the investment hub system may accept TOFs in various formats from multiple sources including files sent directly from investment managers.

The FoHF system may further be configured to optionally have the capability to accept multiple TOFs on a real-time basis. Thus, the investment hub system also may be configured to provide the capability to input fund trade orders by means of online input via an investment hub system desktop, i.e., user interface. If so implemented, online input of TOFs may be initiated either directly by an authorized customer (e.g., an investment manager) or by the FoHF system personnel after receiving client instruction (e.g., received via facsimile). In either case, the investment hub system may be configured to display the appropriate input form to accept the online input of the desired trade information. Thus, the investment hub system may be configured to provide data input screens for, e.g., subscriptions, redemptions and transfers. Upon order data entry completion, the investment hub system may immediately edit the data on the screen before accepting the trade order including verifying that a valid trading account, fund, dealing date, currency, and monetary value (value or units) has been input. If necessary, a subscription to an entirely new fund (e.g., new series) may be accepted even if the underlying fund master-database has not yet been set up previously on the data warehouse.

In this case, a special new fund short form may be utilized to allow the input of the minimum new fund data to process the subscription. Completion and submission of the new fund short fund input may be configured to trigger a secondary workflow to ensure that the full fund master-database is properly set up as soon as possible. Assuming the inputted trade data is valid following the edits, the investment hub system may initiate the appropriate workflow for the transaction and process the trade exactly as if the trade where input by file. As a result, upon receipt of a TOF, it may be dated and time stamped for identification purposes.

Upon receipt of the TOF, the FoHF system may acknowledge delivery of the TOF to the client financial institution by an agreed method (in writing, automatic acknowledgement, etc.). If the client financial institution is maintaining its own middle office operations, then the investment hub system (or some other the FoHF subsystem) may be configured to send an automated acknowledgement back to the client financial institution confirming the receipt of the TOF. That acknowledgement may include, for example, the time of receipt and provide hash control totals from the file as agreed to confirm receipt. An exception procedure may also be established to handle TOFs that are unreadable or that are received after the scheduled cut-off times. The receipt of the TOF may also automatically start workflow(s) for processing each of the trades in the TOF, as explained herein.

All trades included in a TOF may be executed against one omnibus account for the client financial institution (e.g., the individual fund investment managers may not be known to the FoHF system). In one particular implementation, fund identifiers may be standardized so that both the client financial institution and the FoHF system utilize a common identifier. In its own middle office, the client financial institution may continue to maintain an independent fund master database and hold records for its investment managers.

In addition to using its own system records, authorized staff of the client financial institution may also have online access to records of the FoHF system by means of the investment hub middle office module, which may include browser capabilities allowing access via public/private network(s). That browser capability may enable Internet-based access to the latest fund master database, holdings, activity, and price information stored on the investment hub system data warehouse.

Regardless of how the TOF is received by the FoHF system, once the TOF is received and acknowledged by the FoHF system, the information within the file may be validated to ensure that all required information for a trade is present. If a trade does not have the required information, it may be rejected and displayed on an exception report. The required information per trade may be dependent on the trade type, e.g., subscription, redemption, transfer-in and transfer-out. An additional edit may be performed to validate that the account on the trade is a valid account for this client financial institution. If the account is not valid, then the trade may be rejected and displayed on an exception report.

The TOF may have various characteristics, for example, it may be a simple flat file or in Excel™ format, or some other agreed upon format. The TOF may support multiple transaction types, minimally subscriptions and redemptions. The various transaction types may be interspersed in the same TOF and may be processed in the order received (since the client financial institution may be bulking and pre-verifying the data including checking minimum amounts). Trades received on multiple days by the client financial institution prior to a dealing date for the same fund may be consolidated where appropriate and sent to the FoHF system as a single order (e.g., multiple subscriptions by two different investment managers may be blocked into a single subscription against the client financial institution account). All trades may be against one the client financial institution omnibus account (or a small number of accounts to be agreed upon).

The client financial institution may assign fund identifiers for new funds and wherever possible, this same internal identifier may be used by the FoHF system as the internal fund identifier when setting up the fund on the investment hub system fund master database.

The accepted trades, i.e., those passing the pre-process validation, are then entered into the FoHF system trade work flow for processing. At this point, processing of the trade may proceed following the workflow process defined for that trade type.

As mentioned above, the investment hub system may be configured to act as a central control point between various systems/parties that communicate in the FoHF system. Such parties may include, for example, fund investment managers, FoHF middle office administrators (e.g., at a client financial institution), fund administrators (via fund administrative systems 160 and 170, illustrated in FIG. 1, including, for example, fund portfolio accounting systems, Net Asset Valuation (NAV) systems, money transfer systems, shareholder/investor services systems, etc.). In addition to providing automated links to these various parties, the investment hub system may be configured to manage the life cycle of fund transactions from initiation to final cash settlement. Thus, the investment hub system 105 may be configured to accept subscription, redemption, transfer and other fund transactions and automatically or semi-automatically prepare the appropriate application/instruction documents for fund transfer and cash movement.

Therefore, within the investment hub system, pre-defined workflows may facilitate fund subscriptions, redemptions, and transfers. The investment hub system's standard workflows may control fund trades throughout their life cycle from point of receipt to cash settlement. Fund trades may be managed on work queues viewable online. These work queues may be configured to guide trades through each step to settlement.

Thus, the investment hub system and other FoHF subsystems may be configured to streamline fund processing by routing each trade automatically and generating the necessary application and wire transfer documents. The investment hub system may also be configured to maintain a complete history of each step for each trade for audit and control purposes.

In accordance with at least one embodiment of the invention, automated communication paths are established between FoHF subsystems that are external and internal to the investment hub system using configurable adapters. Thus, the FoHF system and its components, in particular, the investment hub system, may be configured to accept and send data from/to any number of its own subsystems and other, external systems in any number of formats including, e.g., file exchange, and by various forms of online messaging.

Figure 3:
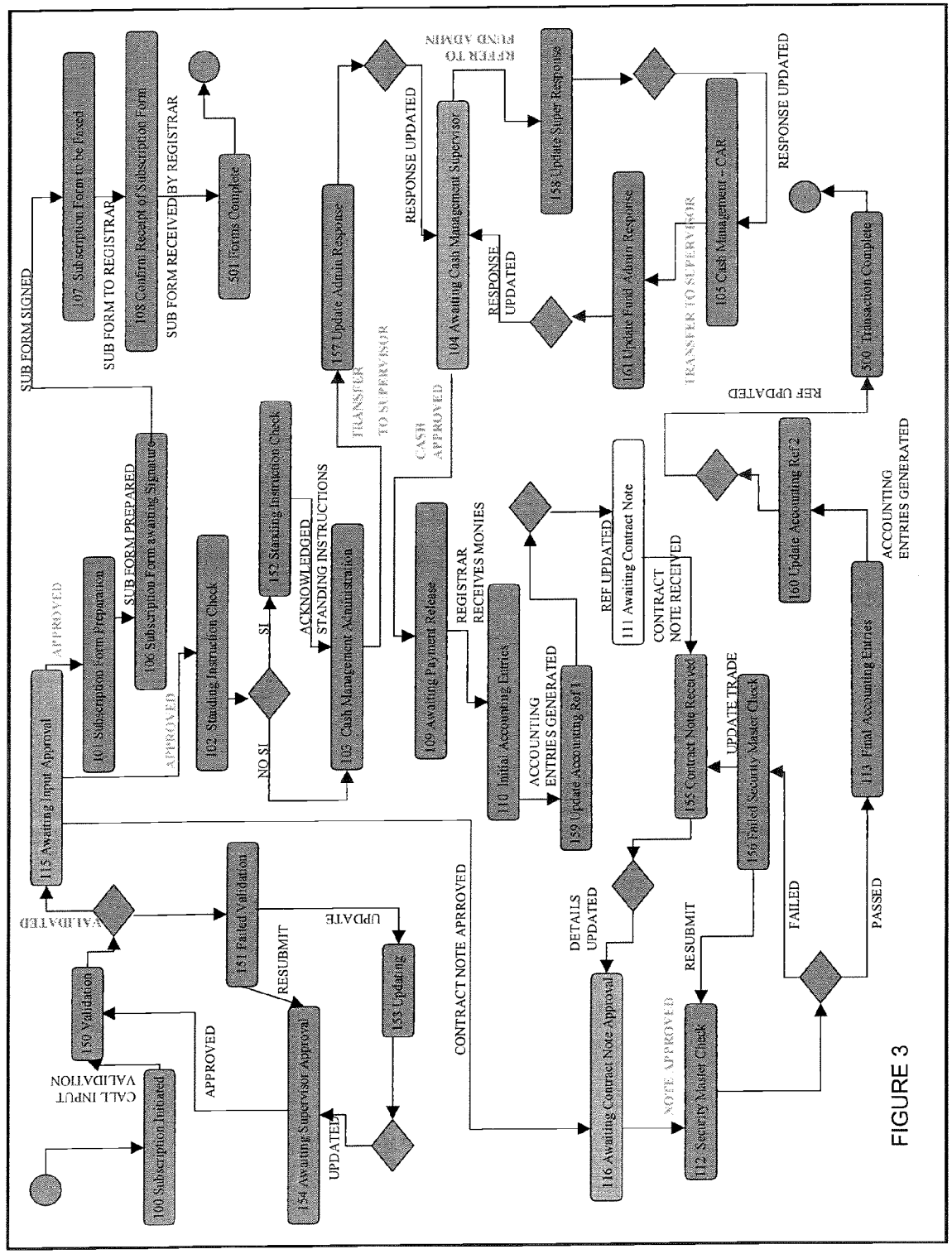
FIG. 3 illustrates one example of monthly subscription workflow.

For the client financial institution, the receipt of a fund subscription (i.e., "purchase") transaction on the TOF may initiate a subscription workflow in the investment hub system for that subscription. For example, on subscription workflow may be started for each subscription on the TOF. Alternatively, or additionally, individual fund subscriptions may also be initiated by online entry into the investment hub system in addition to by file receipt. Each subscription may go through a predefined series of steps collectively called the "life cycle" of that transaction. These interrelated steps have also been formally defined in the investment hub system as a "work-flow." FIG. 3 illustrates one example of a subscription workflow performed on a monthly basis.

The subscription workflow may direct and track a subscription through each step in its life cycle from receipt to settlement. During this period, the investment hub system may also monitor the trade's progress through these steps on a work queue, which may be viewed online by authorized users. The investment hub system likewise may maintain a complete and permanent history of each workflow step so that an audit trail may be available regarding the specific events, times, and persons involved in the handling of each transaction.

Authorized users can view the work queues at any time to determine the status of any pending subscription as it progresses through its individual steps. The investment hub system 105 may also proactively review the work queues to highlight time critical activities requiring attention and to prevent bottlenecks before they occur. Whenever possible, the investment hub system may be configured to pass the trade straight through to the next step in its life cycle automatically. For some steps, however, manual intervention may be required. In such situations, the investment hub system may be configured to hold the transaction at that step until the required manual action is taken. After the needed action has been performed, an online entry may be made in the investment hub system signifying that the required action has been successfully completed and the workflow may continue to the next step.

To facilitate trade confirmation and settlement, the investment hub system 105 may further be configured to generate source documents and paperwork necessary for fund of funds trades. These documents may include a subscription (and redemption) application form and a money transfer form. The subscription application form may be sent/faxed to the fund administrator to formally apply for the subscription/redemption. Depending upon the registrar, the registrar may not accept a generic application form unless it is formatted to their specific standards (electronic communication of subscription/redemption applications is not yet available).

As an additional option, application forms may be customized so that a different format is prepared based upon the registrar to whom the form may be sent. Customization may be accomplished by creating a separate or modified XML style sheet containing the desired formatting for each different format.

Likewise, the investment hub system may prepare on demand the money transfer form necessary to send a wire transfer in payment of the purchase. The money transfer form may be used to manually input the necessary money transfer into appropriate FoHF subsystems. As an additional option, the investment hub system may be configured to automatically generate and send a SWIFT MT103 money transfer message (or MT910 credit notification in the case of a redemption) rather than preparing such a form.

The formal steps in the subscription life cycle may include, e.g., data validation to ensure required fields have been input, recording each subscription on the data warehouse as both a pending trade and as a new lot inventory record in a preliminary status before the final trade details are known, directing and assisting in the preparation and sending of the appropriate dealing forms, and overseeing a cash management check to ensure cash availability upon settlement and then directing the transfer of subscription money to the designated bank account before fund cut-off.

The transfer may be accomplished by creating a worksheet document containing the wire instructions to send money via FoHF subsystem(s). Optionally, an appropriate SWIFT MT103 money transfer may be generated and sent automatically upon approval of the money amounts. The formal steps in the subscription life cycle further may include continuing to hold the trade in a pending status until receipt of the contract note from the registrar and then recording the fund price, units, and equalization factor (if any) from the contract into investment hub system. The investment hub system in turn may then update the lot inventory records for the fund to reflect the correct number the units in the new lot and records any equalization adjustments that are necessary.

The investment hub system may be configured to provide online search capabilities to easily fund a desired fund or group of funds within the fund master database. Funds may be found by searching by fund name or partial name, by identifier, or by inputting one or more fund characteristics (e.g., fund strategy, minimum investment size, hot issues allowed, etc.). The investment hub system may be configured to accept such criteria and locate any fund(s) on the fund master database that meet the selection criteria. The selected funds may be returned on a search list. If desired, a user may drill-down on any fund on the search list to view the full fund profile for that fund.

To obtain additional detail on specific funds, each user may first be granted explicit authority to access the full indicative detail for that fund. If such view authority has been granted, a user may drill-down on the fund to view the full fund profile for the fund. The fund profile may be a full-page display that shows the salient fund indicative data and documents for that fund organized into a series of tabs. If no such authority to see fund detail has been granted, the user may not be able to view the fund profile for that fund without first contacting the appropriate the FoHF system personnel and being granted authority to access the information.

Fund redemption (i.e. "sale") transactions may be sent to the FoHF system in the TOF from the client financial institution in the same manner as described with regard to subscriptions. The client financial institution may hold individual redemptions for transmission to the FoHF system on an agreed upon date prior to the fund dealing date.

If a partial redemption is requested, the redemption transaction may indicate the specific fund lot inventory record to be disposed. Optionally, individual redemption transactions may also be entered online by authorized users directly into investment hub system for immediate processing by the FoHF system.

Figure 4:
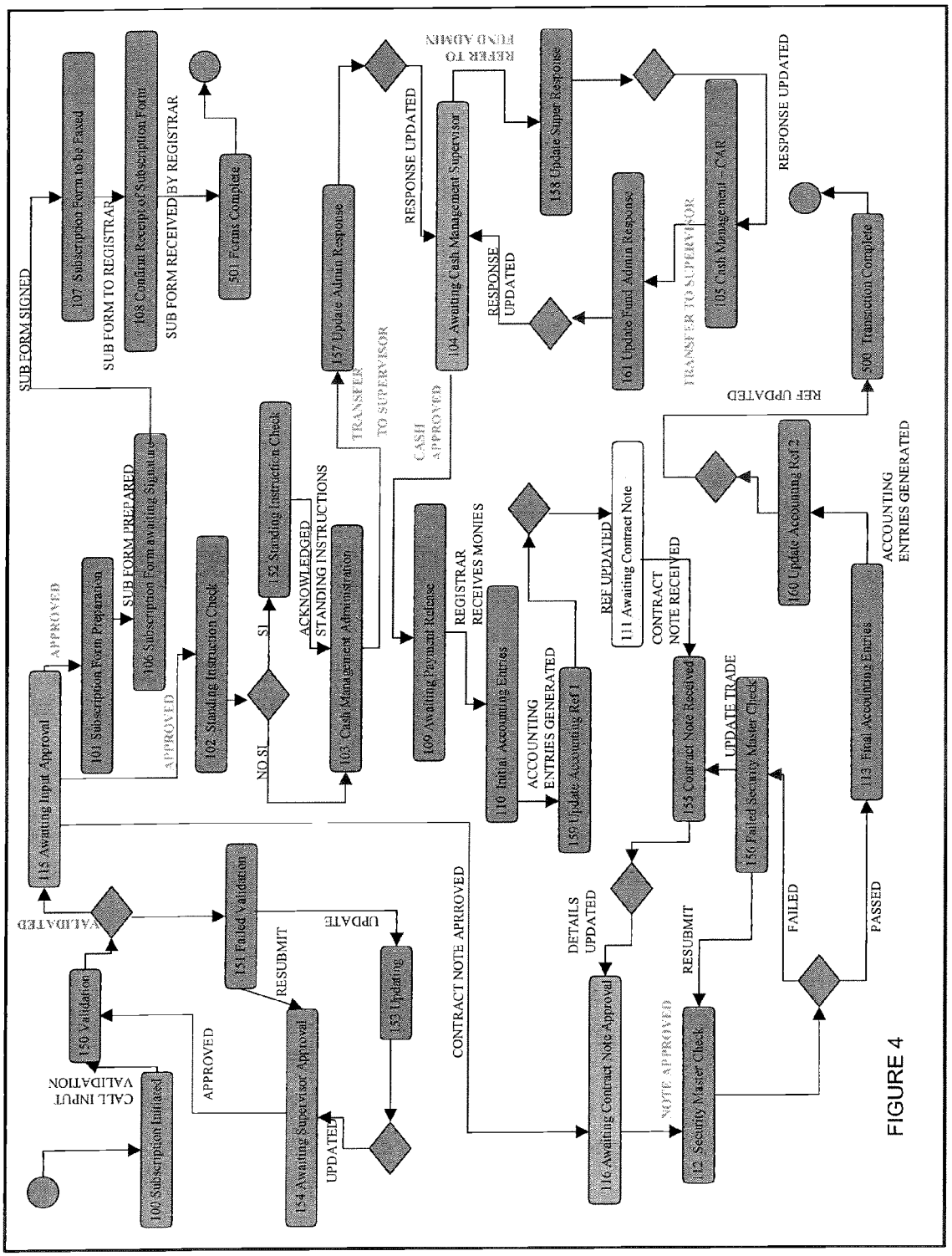
FIG. 4 illustrates one example of a redemption workflow.

Upon TOF receipt, the investment hub system may identify any redemption transactions in the TOF and automatically initiate a redemption workflow for each such redemption transaction. The workflow may control each redemption transaction through the various steps for that transaction until full receipt of proceeds. The formal steps in the redemption life cycle may include, e.g., data validation, including checking stock availability against the lot inventory records, preparing and completing the necessary redemption forms, validating any standing instructions, signing and sending the redemption forms to the registrar, acknowledging receipt of the redemption forms from the registrar, receiving the contract note and inputting the redemption financial details into the investment hub system, and generating a SWIFT receipt notification form (e.g., MT910) in anticipation of the proceeds and receiving the redemption proceeds. If partial payment is received, the redemption may be tracked until full amount is sent. FIG. 4 illustrates one example of a redemption workflow.

In some cases, the redemption amount may be based on an estimated price (sometimes waiting for a period end audit to be completed). In such cases, only a fixed percentage (e.g., 80%) of the redemption cash is received initially and the remainder is held for subsequent payment (sometimes in several installments or traunches). The final settlement/receipt of proceeds may extend over several months. When this occurs, the investment hub system workflow may continue to track the redemption until the full expected cash amount is received.

Figure 5:
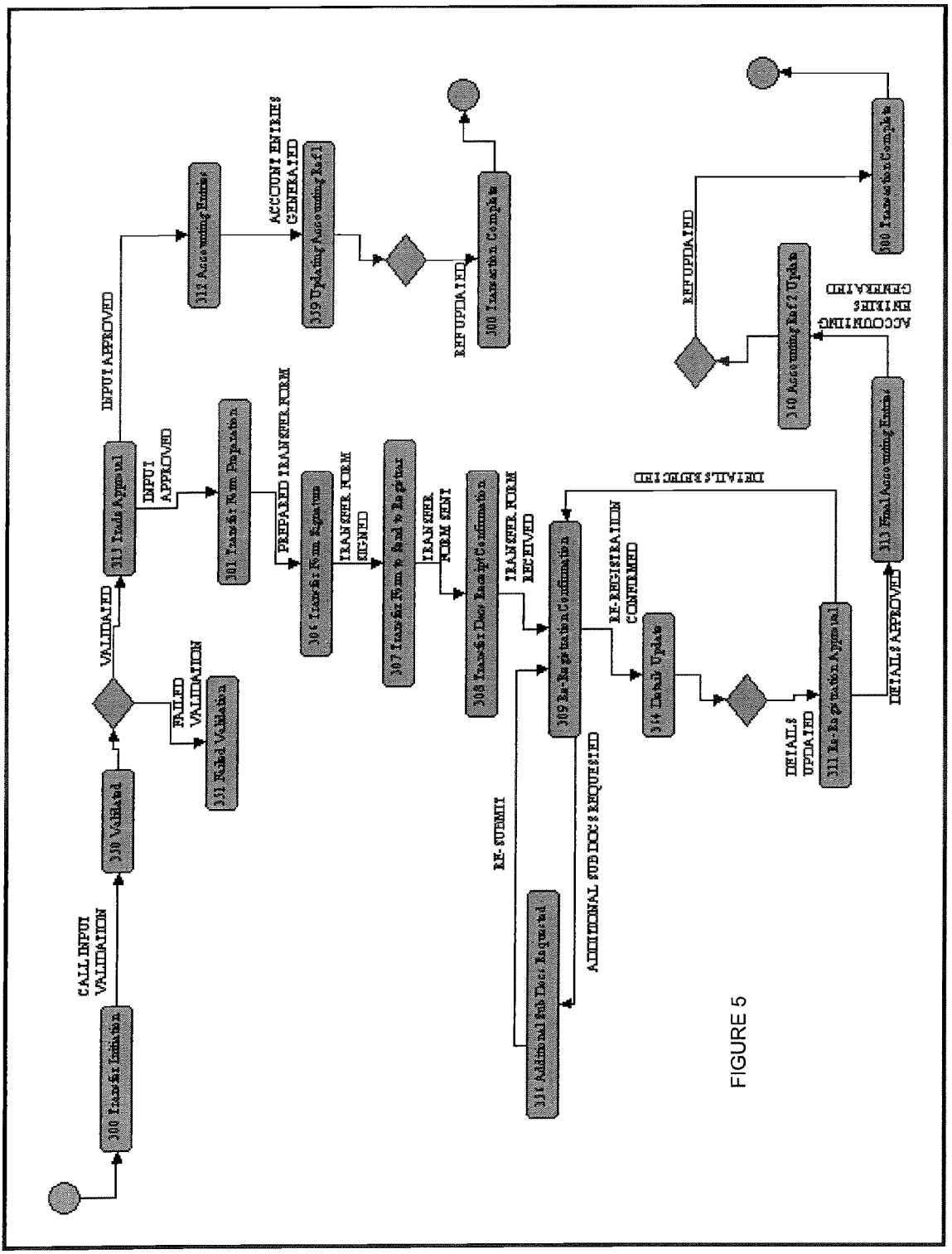
FIG. 5 illustrates one example of a transfer-in workflow.
Figure 6:
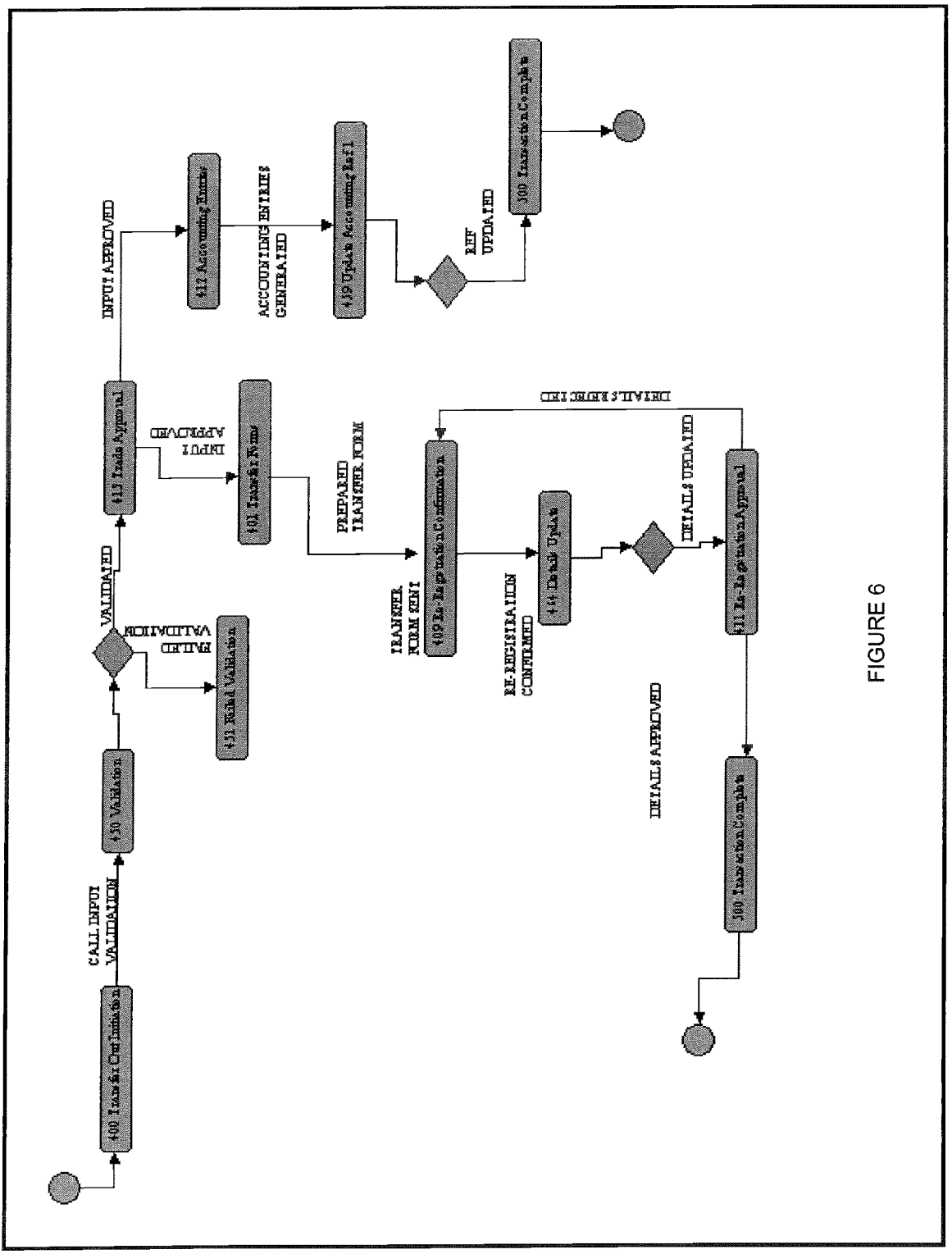
FIG. 6 illustrates one example of a transfer-out workflow.

The investment hub system 105 may also be configured to provide standard workflows for processing transfers. In one implementation, transfers may be processed in two separate workflows—transfer-in workflow (see FIG. 5 for an example of one particular implementation) and a corresponding transfer-out workflow (see FIG. 6 for an example of one particular implementation). In such an implementation, transfers may be entered to the investment hub system 105 by online screen input by authorized staff rather than be file receipt.

Alternatively, transfers may be processed for the client financial institution and included on the TOF.

In accordance with at least one embodiment of the invention, when processing a new redemption or a transfer-out, the trade entered may identify the tax lot to be redeemed. Each subscription may include a unique trade reference identifier assigned by the client financial institution. This identifier may be used (in conjunction with the lot acquisition date and another internal investment hub system identifier) to designate each tax lot. The tax lot designation, either entered or received in the TOF, may be used as part of any stock availability verification that may be performed. Thus, each redemption trade may include the lot identifier of the specific holding lot to be disposed.

There are two different methods available for identifying the designated tax lot. In the first method, the tax lot number assigned at the time the subscription was created and posted is used. This tax lot number may be assigned by the FoHF system and stored in the data warehouse. The client financial institution may be able to obtain the lot number via a query to the data warehouse and then include it in the TOF. In an alternative method, the original client trade ID number associated with the transaction that created the tax lot, i.e., original subscription, may also be used to identify the tax lot to be redeemed. Again, the original client trade ID number may be stored in the FOHF system's data warehouse for this purpose.

If the total amount to be redeemed/transferred out exceeds the position of a single tax lot, then multiple individual redemption/transfer out transactions may be processed. Partial tax lot redemptions/transfers may also be processed by the FoHF system. In this case, the remaining balance of the tax lot redeemed/transferred may remain in the FoHF system with the same parameters as the original tax lot, e.g., tax lot number and original client trade ID, except that the balance may be adjusted accordingly.

As part of the redemption/transfer out workflow, the tax lot number and/or the client transaction number may be displayed, e.g., on a new redemption/transfer out input screen/user interface, for validation. These fields may be populated from the transaction received in the TOF. The pre-process validation may check that at least one of these fields if present. For manually entered redemptions/transfers, users located either at the client financial institution or the FoHF system may have the ability to enter these numbers.

In addition to subscriptions, redemptions, and transfers, the investment hub system may be configured to also provide additional other online accounting and corporate action transactions to maintain lot information. Alternatively, the investment hub system may not maintain lot inventory records itself but instead receives an automated feed of these updated records from an independent portfolio accounting/security movement system.

Immediately upon completion of transaction data entry, the investment hub system verifies that all required fields have been entered and that numeric values and valid dates have been entered in the appropriate fields. Exceptions may be flagged and must be corrected. Depending on the transaction type, the investment hub system may also look up information from the investment hub system fund master-database and other tables and displays this information on the input screen to verify the input data and help ensure that is correct. Assuming the transaction data passes all edit and validation tests, the user may excite a "Submit" icon on the input screen to trigger acceptance of the trade by the investment hub system.

Depending upon the transaction type, the investment hub system may initiate a workflow to process the transaction. The workflow typically includes recording the transaction on the data warehouse, updating the lot inventory table to reflect the transaction, and progressing the trade along the steps in its life cycle. The updating of the lot inventory records may be controlled by a series of new posting rules tables, which contain the instructions for processing each transaction type. As new transaction types are added, the rules may be expanded to support the new types.

Assuming that the investment hub system solely maintains the fund lot inventory records rather than receiving a feed of the updated fund holdings from another fund accounting systems, then the investment hub system may be configured to accept additional fund of fund transaction types beyond standard subscriptions, redemptions, and transfers. These additional transaction types may include, for example, free receives and delivers, write on of equalization shares, registration changes, lot splits or consolidations, holdings restrictions and releases, roll-ups, status changes, amendments and cancellations, reversals and corrections, cash transfers, etc. These additional transactions may be input to the investment hub system via specialized user interfaces, e.g., online screens. The investment hub system may display a different input screen depending upon the type of transaction to be entered. Only authorized users, typically the FoHF system staff only, may have access to these screens. Each screen may provide a fill-in-the-blanks web-based input form. Drop-down lists and check boxes may be utilized to ensure that only valid choices may be entered, where this is appropriate.

In accordance with at least one embodiment of the invention, functionality may include fund price instructions as well as providing the ability to input price changes online.

The investment hub system may maintain pricing instructions for each fund via online entry, may automatically monitor the pricing instructions to detect prices becoming due, may prepare a fund price reminder list to alert when price updates are expected, may accept the online input of updated prices by authorized personnel, may check the inputted prices for reasonableness, and may periodically scan all prices to further check for stale prices.

As part of the initial fund set up and thereafter whenever a change of instruction is necessary, the investment hub system may accept the online input of one or more price instructions for a target fund. The price instructions for each fund may include, for example, price source, price type, price schedule (e.g., date/frequency), reminder day amount (e.g., the number of days before the scheduled price date to remind that a price is due), stale price day amount (e.g., the number of days following the last price date before a fund price is considered "stale"), price tolerance (e.g., an absolute (or relative) percentage amount to be used for price tolerance testing), customer/party of interest ID (e.g., the ID of the corresponding customer master record in the data warehouse where additional information regarding the price source for this fund can be found), special instructions, etc.

The price instructions may be added online via the investment hub system 105 desktop. When required, multiple price instructions may be set up for the same fund (e.g., estimated NAV price monthly from investment manager and final NAV price quarterly from administrator). Each price source may also be optionally set up centrally on the customer/party of interest database to allow expanded name, address, and synoptic information regarding that source. Only authorized users may be allowed to set up and maintain price instructions.

Upon demand, whenever desired and automatically on a scheduled basis such as daily, the investment hub system may review all price instructions on the fund master-database and identify any funds due to be priced (as determined by the reminder day amount and price schedule information), or that are scheduled to receive a price update at some time period input in the future. The investment hub system may then check to see if a price has already been received for the fund according to the fund instruction. If not, the fund may be included on a fund price reminder list, which may be displayed online or may be printed, if desired.

The fund price reminder list may be sorted by scheduled price date and then by source, listing all funds that are scheduled to receive a price. The price instructions for each fund may also be shown.

Clicking on a specific fund on the fund price reminder online display may trigger the investment hub system to open the new fund price input form for that fund. The new fund price input form may display the price instructions for the fund, the last fund price and last fund price date, and allow the input of an updated price for the fund.

The investment hub system may also allow the entry of a new price or a change of an existing price for any single fund (rather than picking the fund from the reminder list). Upon entry, the investment hub system may check if the inputted price is within the designated price tolerance for this fund as specified on the price instructions. If so, the input price may be accepted and stored on the issue price history on the investment hub system data warehouse.

If not within tolerance, a warning message may be displayed on the input form and the price may not be automatically recorded in the data warehouse. Instead, the user may be required to first double check the price. If desired, the warning may be overridden by manual entry authorizing the price and the price is then accepted. Optionally, as an additional step following price validation, each fund price change may also require a secondary approval by a person other than the person originally inputting the price. When secondary approval is required, a second FoHF system individual who is authorized to permit such price updates must approve each new price. Only after the second approval step is the updated price recorded on the data warehouse.

All accepted prices may be stored in an issue price history table in the data warehouse. When desired, a complete online review of past fund prices can be retrieved and viewed online by authorized users.

Once a fund price is updated, that current price is immediately available for inclusion on the investment hub system online inquiries including inquiries showing the latest lot inventory.

The investment hub system may pro vide a new stale price online inquiry that reviews all fund prices to ensure that they are current. The inquiry can be run on demand by authorized users and can also be scheduled to run automatically on a recurring basis. The inquiry can check each fund to ensure that the latest price on the data warehouse for that fund is within the defined price age limit for that fund as defined by the "stale price number of days" on the fund master-database. If not, the fund may be included on the stale price list.

Optionally, the investment hub system may be configured to accept an automated feed of fund prices from any price source able to provide such a feed. However, the investment hub system may be configured to first verify that the prices are accurate/within tolerance before automatically accepting the prices on the price file. If not within tolerance, the investment hub system may direct questionable prices to an exception queue for manual review and online correction, if appropriate.

The investment hub system may be configured to provide an end-to-end fund of funds solution that utilizes a fund master database accessible by authorized users via one or more public and/or private networks, e.g., the Internet. The fund master database may be resident within the data warehouse, which may be implemented in one geographical location or distributed throughout remote geographic location but acting in a cooperative manner to deliver services in a unified way. The fund master database may be configured to maintain and store up-to-date indicative and price data for each fund handled by the FoHF system; as such, the fund master database may be maintained online by authorized FoHF fund analysts and other approved personnel.

Fund maintenance may be performed online by completing a fill-in-the-blanks web-based form. As appropriate, such a form may include drop-down lists and check boxes to limit input to only valid codes. When a new share class or series is opened within an existing umbrella fund, the investment hub system 100 may populate appropriate default values within the form for the new class/series based upon data previously entered for the fund and according to the fund's hierarchical structure. Such inheritance of data within the same fund minimizes the amount of user input and reduces the chance of input errors. Optionally, banking instructions may optionally be entered or approved independently of other static data for security purposes.

The investment hub system also may be configured to accept input of fund-related static documents and store these documents online within the investment hub system data warehouse for online retrieval by authorized users. Such documents may first be converted/scanned to PDF (or other) format and then uploaded to the data warehouse. The investment hub system data warehouse may be configured to accept any number of documents and also to maintain prior versions of these documents, e.g., fund prospectus, subscription forms, redemption forms, switch forms, financial statements, and summary fund fact sheets. For the client financial institution, a wider variety of fund documents may be required including general correspondence, trade confirmations, authorized signature, etc. Optionally, a user may add personal private notes regarding funds and view these notes online. Optionally, the FoHF system may be configured to store documents at the account level, e.g., a certificate of incorporation for a company.

Thus, the data warehouse may also be configured to provide online storage for a variety of fund documents (e.g., fund prospectus, application forms, fact sheet, etc.) all of which may be made available online. The data warehouse may further be configured to provide the most current fund holdings with price information for each fund which is accessible online over the Internet by user-definable inquiries. Accordingly, the data warehouse may be configured to store salient fund information and make that information available to users online; the data warehouse may also make various fund documents available for online retrieval/download such as fund prospectus and application forms.

Although notice announcements may be dealt with manually, the FoHF system may be configured to include an enhanced fund corporate action facility that accepts notice announcements online, that includes new transactions and workflows, and that optionally generates fund corporate action transactions.

The investment hub system may be configured to provide an enhanced online facility for inputting various types of fund-related corporate action announcements onto the central database, may provide an online notice board to allow authorized clients as well as internal staff to view these corporate actions notices via the Internet, and may provide additional types of fund financial transactions to affect corporate actions against existing fund holdings. The investment hub system may support, for example, proxy announcements. From time to time, a fund registrar or its designated proxy agent may contact fund shareholders to request their vote on fund-related events or activities. For example, every registered fund shareholder receives proxy resolution and voting materials, via the mail or electronic communications, to inform the investors of issues for consideration at the company's annual general meeting each year. In these cases, the registrar may send these materials to the FoHF system as the registered nominee holder of the fund. The FoHF system may then inform the client financial institution (and any other fund holders) of the announcement, forward any appropriate documents to them, and wait for the client financial institution's response regarding their individual votes on the action. As appropriate, the client financial institution may in turn also contact the individual investment managers for direction regarding the proxy vote. On receiving the responses back from the client financial institution (and, if appropriate, other clients), the FoHF system may accumulate the votes from its various clients and forward the results to the administrator/proxy agent, voting in nominee name on behalf of the actual beneficial owner(s). If no response is sent by the proxy deadline, the ballot may be automatically cast in favor of management's recommendation.

Many funds issue shares in series as opposed to issuing a single share class. New investors entering the fund each dealing day are issued a difference series. For example in a monthly dealing fund, twelve series could be issued over the course of year. Over time, the number of series can become cumbersome to manage. As a result, it is common for funds to "roll-up" the multiple series into a single consolidated series at a designated time, typically at fund year-end. Accordingly, the investment hub system 105 may be configured to provide a special transaction to accomplish the rollup and possibly to also generate these transactions automatically for any fund holding any of the rolled-up series.

Moreover, because the names of funds can change over time, when a name change occurs, fund holders must be notified of the change in advance. Thus, the fund name may be updated on the fund master-database on the appropriate effective date of the change. It may also be possible to report on a fund holding using its original name (up to the point in time when it changed) and thereafter using its new name. An audit trail of the change, capturing date and originator of change, may also be stored.

Fund liquidation occurs when an underlying fund ceases to trade and decides to liquidate. At that time, the fund may usually sell all of its assets and pay its shareholders. Such payments can be made in installments rather than single payment. However, fund holders must be notified of the liquidation; thus, the fund master-database includes a fund status field that indicates when such a change occurs to prevent additional fund subscriptions.

To meet corporate action requirements, the investment hub system may accept the online input of corporate action announcements. The announcement may be entered on a new online corporate action announcement form. Such corporate action announcements can be entered by authorized users only, normally the FoHF system staff in communication with the fund registrars, fund management, and other appropriate fund agents. Each announcement may minimally include the type of corporate action (e.g., name change, proxy voting options, etc.), the relevant effective dates involving the announcement, and a full description of the announcement. The full description of the announcement may be in the form of free form text or a link to another electronic document detailing the particulars of the announcement. The electronic document may typically be stored in PDF format as an Electronic Report (E-Report) in the data warehouse.

Upon acceptance of the announcement, the announcement may be stored in the investment hub system data warehouse and may be accessible to authorized users via the investment hub system notice board. The data warehouse may be configured to maintain a complete history of past corporate action announcements. This history may also be accessible by the notice board. Authorized users including the client financial institution staff may be able to view new, pending, and historic corporate action announcements via the notice board. The notice board lists each outstanding notice on a single line. Each line indicates the fund name, the type of corporate action, and effective dates for the action. Clicking on a single corporate action notice on the notice board may trigger opening of a full-page corporate action notice detail display of that particular announcement. The detail may include the full description of the corporate action and indicate any follow up or options to be taken regarding the corporate action.

Responses to elective corporate action choices (e.g., proxy voting choices) may be handled outside of the investment hub system by facsimile transmission, electronic mail, or other approved methods. Alternatively, electronic responses to elective corporate actions may be processed within the investment hub system.

The investment hub system may be further configured to accept the online input of individual corporate action transactions that affect the lot inventory records and that may be recorded on the permanent history of the fund. These additional transactions include roll-ups, name changes, partial and full liquidation, etc. Minimally, the investment hub system may provide input screens to enable these special corporate action transaction types to be entered one-at-time, fund-by-fund. Corresponding workflows may also track the pending corporate action transactions through their life cycle. Only authorized persons, typically the FoHF system staff, may be able to enter the corporate action transactions. In addition to single transaction entry, the investment hub system may be configured to automatically generate corporate action transactions in mass for all holders of a particular fund based upon the details of that announcement (e.g., generate all the roll-ups for every series holder when multiple accounts hold the series) and then release these transaction for bulk posting, rather than entering each transaction individually.

Thus, in accordance with at least one embodiment of the invention, the investment hub system may also be configured to accept online input of corporate events (e.g., proxy announcement, fund closing, new series, etc.) into the data warehouse, in particular the fund master database, entered by FoHF administrative staff. Once input, both price and corporate action notice information may be made immediately available online to authorized client financial institution and FoHF system staff via the investment hub system.

Financial analysts may also scan and upload key fund documents in PDF (or other) format into the data warehouse. Similar to the salient fund data, these documents may be accessible over the Internet to authorized users through the investment hub system or alternatively by a stand-alone document management application As necessary, the investment hub system may generate a daily file of changes and new fund setups that have occurred that day in the fund master database. The information included in that database may be transmitted to other FoHF subsystems. Additional interfaces may also be desirable with other FoHF subsystems, e.g., to facilitate document management, fund accounting, and uploading of investor/fund shareholder information from a FoHF subsystem into the investment hub system for incorporation into the data warehouse.

Cash balances and wire transfers may be kept/sent by the FoHF system's accounting subsystem not within the investment hub system. However, the investment hub system may be configured to provide online cash forecast projections to assist in fund cash management. The investment hub system optionally provides the ability to compute rate of return investment performance by means of a global performance measurement component. In addition to computing rates of return, global performance measurement component may provide sophisticated performance attribution analyses and display performance results online in user-definable reports and inquiries accessible in an investment hub system desktop.

In accordance with at least one embodiment of the invention, the investment hub system may automatically send information to the FoHF fund accounting subsystem(s) so that the FoHF fund accounting subsystem(s) can maintain the fund accounting records for FoHF system clients. Information to be sent to the FoHF fund accounting subsystem(s) may include financial transactions received initially by file or entered directly online into the investment hub system and fund prices received from various sources and cleansed in the investment hub system.

On a daily basis, one or more FoHF subsystems may send account information to be loaded onto the data warehouse; that information for each identified account may include, for example, settled positions, tax lots and transactions. In addition, new account static information may be sent to establish an account in data warehouse. This information may be refreshed on a daily (business days only) basis for all accounts.

Similarly, at the end of each business day, one or more FoHF subsystems may create several extracts to be sent to the data warehouse. The files created may be sent to an FTP site at the FoHF system and then sent to update the data warehouse. This process may be automated and may not require any manual intervention. Further, settled positions from the portfolio accounts on one or more of the FoHF subsystems may be extracted daily and sent to the data warehouse at the end of the business day. That information may include, for example, account number, account currency, valuation date, security number, security qualifier, security currency, long/short term indicator, settled shares, settled cost (local), settled cost (base), average unit cost (local), etc. Once received from the FoHF subsystems, the information may be loaded into the investment hub system 105.

The FoHF fund accounting subsystem(s) may maintain accounting records in parallel and in synchronization with the lot inventory (i.e., custody) fund records maintained by the investment hub system.

Periodically, e.g., at the end to each fund valuation period, the FoHF system may receive formal statements from the fund administrator showing activity for the current period just ended and listing end of period fund holdings registered in the FoHF system's nominee name. Conventionally, such statements have not been available in electronic form. Upon receiving the statements, the FoHF system staff may reconcile the information on the reports with the corresponding fund information on the investment hub system. That reconciliation may be conducted manually by running customized inquiries on the investment hub system, exporting the investment hub system inquiry results to a spreadsheet, and then using the spreadsheet to compare the investment hub system data to the corresponding statement information. Alternatively, the reconciliation may be conducted independent of the FoHF system reconciliation systems.

The investment hub system may maintain the holdings records for the funds, rather than interfacing with a portfolio accounting system such as the FoHF fund accounting subsystem(s). The investment hub system may be configured to provide some sort of simple accounting/security movement facility that minimally keeps a lot-level inventory of all fund holdings. Maintaining an inventory tally may be relatively simple by listing a quantity held in a lot in a status field and tracking pending subscriptions and redemptions as well as settled shares. No profit/loss may be required and, for the client financial institution, only a simple quantity×price in local currency valuation may be necessary. Equalization shares may be maintained and some sort of corporate action generation of rollups, etc. may also be provided.

A lot inventory posting engine may be utilized to update custody holdings within the investment hub system fund subscription/redemption/transfer workflows and may also accept miscellaneous transactions to maintain the holdings, set up fund pricing instructions within the investment hub system, accept fund prices online, and monitor scheduled/stale prices automatically.

In order to improve efficiency and reduce processing time, the investment hub system may implement automated interfaces with a variety of different internal and external systems in order to provide scalable and high quality FoHF services in the FoHF system For example, in accordance with at least one embodiment of the invention, the investment hub system may provide an automated interface with the appropriate FoHF accounting subsystem(s), which may then keep the official fund holding records. Such an automated interface between the investment hub system and the FoHF accounting subsystem(s) (included within the FoHF subsystems 180 illustrated in FIG. 1) may facilitate passing the appropriate set of accounting transactions from the investment hub system to the accounting subsystem 180 and receiving back updated holdings and posted transaction information from that accounting subsystem 180. The updated holdings and transactions may then be stored on the data warehouse and be available for online inquiry and reporting to both the components of the FoHF system and to the client financial institution.

At an appropriate point in the subscription and redemption lifecycle, the investment hub system may prepare a source document detailing the money amount to transfer or to expect in receipt based upon the particulars of the trade and using the standing payment instructions for that fund as recorded on the fund master database. In one particular implementation, the cash transfer source document may be used to manually input the appropriate cash transfer transaction into the FoHF accounting subsystem. Alternatively, this information may be extracted from data stored by the FoHF system of from the client financial institution.

Subsequently, the investment hub system may automatically generate the appropriate SWIFT message authorizing payment or expected receipt of cash and send this message to the appropriate FoHF subsystem upon the input of the appropriate authorization for the transfer into investment hub system.

In accordance with at least one embodiment of the invention, information associated with fund transactions received and managed by the investment hub system may be sent to one or more FoHF fund accounting subsystems, which may maintain official accounting records for the fund(s) in synch with the custody inventory records maintained on the investment hub system. The FoHF fund accounting subsystem(s) may likewise perform any valuation and profit/loss calculations required. The custody records for the funds may remain on the investment hub system. As required, the FoHF fund accounting subsystem(s) may send back updated positions and full transaction history for the fund(s).

In accordance with at least one embodiment of the invention, the FoHF system may be implemented in connection with a suite of services that provide a full range of transaction types required by FoHF. As such, this particular implementation of the invention may provide easy document creation from templates, offer 'look-ahead' lifecycle reporting and history, and track trades through the back-office life cycle, capturing data on an "event-stage" basis. In such an implementation, the investment hub system may be configured to monitor each trade during its life cycle and ensure that each step has been successfully accomplished. When implemented further in connection with web-enabled reporting functionality, this particular implementation may provide transparency to a majority or the entirety of a back-office FoHF process.

For example, referring again to FIG. 2, using the investment hub system 105, a FoHF pricing subsystem 150 tracks fund prices that are due to be updated on the data warehouse and inputs the current estimated/final price for each fund by means of online entry. Alternatively, automated price feeds from selected fund administrators may be provided.

Periodically, FoHF administrative staff may receive period end statements containing official close of period fund holdings information from fund administrative systems 160, 170. Conventionally, such documents are sent in paper form. However, in accordance with at least one embodiment of the invention, the investment hub system 105 may be configured to convey communications including such statements to the FoHF administrative staff from the fund administrators/administrative systems. Upon receipt, FoHF administrative staff may reconcile the end of period positions on the statements to the corresponding holdings records recorded in the investment hub system data warehouse 110. FoHF staff may then use online holdings and activity inquiries and extract this information from the data warehouse 110 to facilitate the reconciliation.

As a further alternative, in accordance with at least one embodiment of the invention, automated data feed of period end statement information and automated reconciliation may be provided by the FoHF system 100 with corresponding information on the investment hub system 105 by configuring automated feeds from fund administrative systems 160, 170.

Tax lot information for all holdings from the portfolio accounts on the FoHF system may be extracted from the appropriate FoHF subsystem daily at the end of the business day. Tax lot information may include, for example, account number, account currency, valuation date, security number, security qualifier, security currency, tax lot open date, tax lot purch settle date, tax lot memo number, tax lot shares, tax lot cost, tax lot cost (base), tax lot original price (local), tax lot original cost, etc. Subsequent to data extraction, an extract file may be created and sent to update the data warehouse. Once the information is received from the FoHF subsystem, the data warehouse may be updated to reflect the tax lots on a settled basis.

Transaction information for the portfolio accounts on the FoHF system may be extracted daily at the end of the business day. Transaction information may include, for example, account number, account currency, security number, security qualifier, issue currency, commission (local), commission (base), contract settlement date, cost, cost (base), effective date, entry date, memo number, memo number—originating, external cross reference, rev/rebook, external memo number, price, price (base), principal amount (base), rebook cross reference memo, relieved memo number, reversal cross reference memo, settlement amount (local), settlement amount (base), settled base FX rate, settlement currency, shares/par value, trade date, trade expense, transaction code, trading currency, etc. Following data extraction, an extract file may be created and sent to update the data warehouse.

As new accounts are added to the FoHF system or current accounts are changed, relevant account information may be sent to the data warehouse by one or more FoHF subsystems. Such information may include, for example, portfolio account number, portfolio account name, base currency, account nominee name, client account number, etc.

In the event that a file received from one or more FoHF subsystems contains invalid data and cannot be processed by the investment hub system, it may be rejected. Subsequently, the FoHF subsystem(s) may be notified via a message that the file received has been rejected and a reason for the rejection. The FoHF subsystem(s) may be configured to then retransmit the corrected file for reprocessing.

When a transaction settlement date is reached for a trade, a record/message may be sent to one or more appropriate FoHF subsystems to update the position for the corresponding account.

The investment hub system and the FoHF accounting subsystem provide fund administration and custody services to hedge fund and FoHF clients, e.g., financial institutions. Within the FoHF's integrated platform, the accounting subsystem is the system of record, while the investment hub system 105 provides a user interface to enter data into the accounting subsystem and to access the resulting accounting information.

Fund managers may deliver trades, which may be processed and executed by the FoHF system using the investment hub system. Upon execution, the details of the trade are delivered into and posted by the FoHF accounting subsystem. Both the trade execution and accounting information may be accessible by the fund managers through an investment hub system web interface.

Within the integrated environment, trades may be received from external sources and initialized into the investment hub system. Upon completion of the trade execution, the details of the trade may be loaded into the FoHF accounting subsystem. On a daily basis, the FoHF accounting subsystem may perform an accounting run. Upon completion of this process, a set of extracts containing account reference data, positions, lots, and transactions may be generated and loaded into the investment hub system data warehouse where it may be made available for inquiry and reporting.

In addition, to processing trades, account and security reference data is synchronized between the investment hub system and the FoHF accounting subsystem, which may occur via two different processes. Account master reference data may initially be set up in the FoHF accounting subsystem, which may flow into the investment hub system during a nightly load. Setup of security master reference data (investibles) may originate in the investment hub system on the FoHF module. Upon completion of the setup, it may be uploaded directly into the FoHF accounting subsystem and may be loaded into the information portal data store where the information may be available for inquiry and analysis.

The loading of trades and security master information from the investment hub system into the FoHF accounting subsystem may occur either in a batch configuration wherein updates are performed once a day using an automatic electronic overnight data feed. Alternatively, updates may occur on a real-time basis as each of the respective validation and setup workflows are completed.

The loading of the account, position, tax lot, and transaction extracts may occur on a daily basis for all accounts. At a set time, the FoHF accounting subsystem may complete its accounting processes and generate the specified extracts. Afterwards, this may be delivered to an FTP directory where the investment hub system data portal may detect the file and load it into the Information Portal data warehouse. This process may occur, for example, at the close of every business day at a set time. The accounting cycle should assume five day per week valuations with no holidays. The extracts from the FoHF accounting subsystem into the investment hub system 105 may be delivered via batch files. Each file may contain the information for all accounts for that given accounting entity.

At a set time at the close of each business day, the FoHF accounting subsystem may generate the required set of extracts and deliver them to an FTP site that is accessible by the investment hub system using a specified file naming convention. This site may be polled periodically by the FoHF accounting subsystem.

On a nightly basis, all lots across all accounts may be extracted from the FoHF accounting subsystem for the last close of business. Lots may be stored in a single file with a file naming. If a back-dated transaction affects a previous valuation, then the FoHF accounting subsystem may need to generate an entire new set of lots for the affected account for that valuation date. Because this change may most likely affect subsequent valuations, the FoHF accounting subsystem may also have to include these new valuations in the same extract as the nightly batch load.

The lots in the extract represent contractually settled lots. No cash balances may be extracted.

The nightly tax lot extract may contain lots across numerous accounts. Therefore, the adapter and/or the data portal may process the TOF using the account as the fundamental unit of work to enable parallel loading for faster throughput. The adapter may also expect that for a given account, there may valuations for multiple days if back-dated valuations occur. In this case, the fundamental unit of work may still be the account, but the adapter and/or the data portal may process the sets in chronological order based on the "as of" date.

On a nightly basis, all transactions across all accounts that posted during the business day may be extracted from the FoHF accounting subsystem. Transactions may be stored in a single file. If there are no transactions, the FoHF accounting subsystem may still generate a blank file. If a back-dated transaction is entered into the FoHF accounting subsystem, then that transaction may also be extracted during the nightly process. The nightly transaction extract may also contain transactions across numerous accounts. Therefore, the FoHF system may process the file using the account as the fundamental unit of work to enable parallel loading for faster throughput.

In accordance with at least one embodiment of the invention, functionality may include enhanced system security limiting user access to authorized funds only. Access to the investment hub system may be provided via one or more public and/or private networks, e.g., using a standard Internet connection, using some type of commercially available browser, e.g., Microsoft Internet Explorer, version 6.0 or later). A user may be required to log onto the investment hub system by entering a user ID and password. Only authorized users may be able to access the investment hub system. These authorized users may be internal the FoHF system staff or personnel at client financial institutions of the FoHF system.

Based upon the user ID (and optionally a broader user class to which each user belongs), functions that appear within an investment hub system desktop (i.e., user interface) may be restricted so that only authorized functions are available. For the client financial institution, only selected functions may be available; for example, for the client financial institution, all users having "view funds" authority may be able to view the entire universe of funds available on the fund master database. No filtering of funds may be provided so that a user is restricted to viewing only a defined subset of all the funds. This "view all funds" security may be acceptable since the client financial institution may be the only external client accessing the system initially. Alternatively, additional security may be incorporated into the investment hub system so that a user at a particular client financial institution may view only designated funds, e.g., those available through arrangement with that client financial institution, i.e., those in that particular client's universe. The qualification regarding the funds that can be viewed by each user may be set up and maintained by an enhanced system administration subsystem utilized by the FoHF system.

In accordance with at least one embodiment of the invention, an additional level of system security may be provided so that users are authorized only to access defined sets of funds and defined types of documents rather than being granted universal access to all funds and all types of documents. This involves keeping additional fund documents online including copies of trading forms, confirmations, and correspondence, some of which is private and can be viewed only by certain users and optionally allowing prior versions of selected documents to be viewed.

The investment hub system may be further configured to provide an assortment of standard online, user-definable inquiry capabilities to view, print, and export fund, fund activity, fund holding, cash projection, and other related fund information on demand. These inquiries can be scheduled to run automatically on a defined frequency with query output delivered by electronic mail, FTP transfer, and the investment hub system e-report delivery.

The investment hub system may be configured to provide online search capabilities to easily find a desired fund or group of funds within the fund master database. Funds may be found by searching by fund name or partial name, by identifier, or by inputting one or more fund characteristics (e.g., fund strategy, minimum investment size, hot issues allowed, etc.). The investment hub system may be configured to accept such criteria and locate any fund(s) on the fund master database that meet the selection criteria. The selected funds may be returned on a search list. If desired, a user may drill-down on any fund on the search list to view the full fund profile for that fund. Optionally, the investment hub system may also provide a public master list of available funds.

That master list may show the fund name plus other minimum public information regarding all funds on the FoHF system fund universe. To obtain additional detail on specific funds, each user may first be granted explicit authority to access the full indicative detail for that fund. If such view authority has been granted, a user may drill-down on the fund to view the full fund profile for the fund. The fund profile may be a full-page display that shows the salient fund indicative data and documents for that fund organized into a series of tabs. If no such authority to see fund detail has been granted, the user may not be able to view the fund profile for that fund without first contacting the appropriate the FoHF system personnel and being granted authority to access the information.

Moreover, the investment hub system may include a fund explorer that may be configured to provide user-definable inquiries into work queues controlling all fund trades in process. Only authorized users may be permitted to view the work queues. Further, users may only view activity in authorized accounts. The work queue inquires may show summary information on all pending active trades for that user or can be modified to present only a defined sub-set of all transactions such as for a designated time period, for a given status or priority, for a given stage in processing, or only for a given trading account/investment manager (e.g., limit display to redemptions awaiting redemption proceeds).

The investment hub system may be configured to further provide standard user-definable inquires to display the individual lot inventory held/pending in any client account or account group. Lot inventory inquiries may be available to authorized users including external clients (e.g., the client financial institution) and to internal staff. The lot inventory inquiries may display the amount held and pending in any account. Drill down to full-page lot inventory detail on each lot holding may be provided as well as navigation to workflow/transaction detail pertaining to that lot. Additionally, the lot level inventory inquiries can be customized to select the desired fields to be displayed, to indicate special formatting and totaling options, and to set sorting and filtering criteria. Once changed, the customized inquiry definition can be saved on the user's investment hub system desktop so that it can be run again whenever desired. As with other standard investment hub system online inquiries, lot inventory inquires can be viewed online, printed, exported to Excel™, displayed in chart form, and scheduled for recurring automated production.

The investment hub system may also be configured to provide online inquiries that forecast future fund cash movements for authorized users. These forecasts may be based upon pending subscription and redemption activity on the investment hub system work queues in the data warehouse. The investment hub system may review all pending activity for a particular client account or for a defined group of client accounts and then display a cash projection analysis based upon the transactions pending cash settlement in these accounts. The cash projection analysis may provide a day-by-day summary of expected cash flow activity. As desired, the user can further break the projection down within a given day into any number of additional aggregate categories including by currency, by transaction type, by account, by fund, and by registrar. The projection may also show the total cash amount projected each day in the desired category and also provide a count of the underlying transactions.

The investment hub system may provide drill-down to lower level detail to any of the cash flows summarized on the cash projection analysis. Clicking on a single line on the cash forecast causes the investment hub system to retrieve and list the individual pending transactions comprising that projected cash amount. Clicking on any single transaction on the individual transaction list further returns a full-page display showing all the detail information regarding the pending trade.

In addition to monitoring investment hub system work queues containing trades in process, fund analysts may input salient fund information online via the investment hub system for target funds in a universe of funds associated with the client financial institution to keep this information accurate and current. This fund information may culled from fund prospectus and other documents and by communicating with fund administrators and administrative systems, investment managers, and the client financial institution. Once input, the updated fund information may be available online via the investment hub system to authorized users at the client financial institution and at the FoHF system.

Likewise, as mentioned above, the investment hub system may be configured to allow fund documents previously loaded in the data warehouse to be viewed/downloaded by authorized users. For each fund, the investment hub system may be configured to display a list of the available documents. Clicking on the name of the document may trigger the investment hub system to display the contents of the document, e.g., in a standard PDF viewer. Optionally, additional user security may be implemented such that users may be allowed to see all public documents for specific funds but must be granted additional authority in order to view various private documents. In addition, an enhancement may be added to view prior versions of documents as well as the most recent version.

Once logged on to the investment hub system, the user may be able to perform authorized functions only as granted based upon their specific user profile. For example, authorized FoHF system users (e.g., not uses associated with a client financial institution) may be able add new target funds and to edit, change, or delete existing fund indicative or salient information. Such information may include fund identifiers and general information, fund structure, fund profile/characteristics, series and class specific attributes, dealing information including both subscriptions and redemptions, payment, registrar, administrator, and other contact details, switches information, transfer information, price/NAV information, etc.

When implemented in connection with web-based reporting, the invention may provide a full inventory of trades and positions with complete detail of their status and history at the lot-level. Further, in accordance with at least one embodiment of the invention, the data warehouse may be configured to perform document management and maintenance for both investables and parties of interest. Thus, at least one embodiment of the invention may be implemented with functionality that stores data of fund structures at a fund, class, sub-class and series level, and allows for relevant prospectuses, financial statements, fact-sheets and dealing forms to be maintained as part of the records, providing a significant disaster recovery resource.

The data warehouse may be configured to provide its functionality to end users via real-time Internet access. Thus, in accordance with at least one embodiment of the invention, the FoHF system may be configured to provide transparency and control around the subscription and redemption process.

At least one embodiment of the invention may be implemented with functionality that maintains contact details for parties of interest, such as a target investable, and/or FoHF manager, fund administrator and transfer agent identities. Moreover, complete investment documentation may be created and communicated to the underlying hedge funds.

Returning to FIG. 1, the investment hub system may be further configured to pass fund transactions, price information, and cash settlement instructions to other FoHF subsystems 180 to ensure accurate and synchronized information across FoHF internal systems.

Within the investment hub system included in the FoHF system, a plurality of different "desktops," i.e., user interfaces, can be configured to meet the needs of specific classes of users. Any number of desktops can be configured, selecting from any of the functions provided by investment hub system. For example, end users of the FoHF system may include, e.g., client financial institution staff, FoHF analysts/fund administrative personnel, FoHF pricing personnel, investment managers, and at least one systems administrator (with the capability to set up new users, grant/deny user permissions and/or configure additional desktops).

Via the investment hub system, authorized professional staff in the client financial institution (that desire to keep a middle office operation) may access various online functionality including the ability to view, find, and export fund indicative information and fund documents for any of the target funds included in the client financial institution fund universe. This capability may be paired with the ability to submit TOFs to the FoHF system on a periodic basis, e.g., twice per day (or other agreed upon schedule) for immediate processing by the FoHF system Thus the investment hub system may be configured to perform online monitoring of the status of any TOF or individual trade previously sent to the FoHF system and to drill-down for additional detail on any single trade, including the ability to view summary relevant control statistics.

The investment hub system may further provide an end user with the ability to view the current lot-level inventory of any fund (or of all funds in a client financial institution omnibus account) including showing by lot the amount/units currently held in that fund, any pending subscription or redemption activity, and showing the most recent unit value (final or estimated NAV) for that fund. Additionally, an end user may have the ability to create user definable inquiries that designate specific fields, provide sort and filtering criteria, and that provide for the online viewing, printing, and/or exporting of fund master database, fund activity, fund lot inventory (e.g., a unique record for each different subscription/acquisition in that fund called the lot inventory), and fund price data.

Additionally, the investment hub system may be configured to support online input of individual fund subscription, redemption, and switch/transfer transactions online for direct submission to the FoHF as an alternative to submission of TOFs. In accordance with at least one embodiment of the invention, all fund unit prices (estimated and final) may be entered by online input into investment hub system upon receipt of the latest fund prices by fax or other means. In such an implementation, no automated feed of fund prices may be required since this type of interface may generally not be available today in the industry. Further, period end statements may be used to accomplish reconciliation of holdings with administrator/transfer agent records and no automated feed of end of period statement holdings may be necessary.

Additionally, no automated interface with the FoHF system internal fund accounting systems may be required assuming that investment hub system performs the fund lot level accounting. If fund lot accounting is not maintained in the investment hub system, then the investment hub system may require an interface with the FoHF subsystem(s) that maintains the lot holdings records. That interface may require a feed of updated holdings at the lot level plus the input of any transaction causing a change in a fund holding position.

In an alternative implementation, the investment hub system may accept one or more automated feed(s) of fund prices from various sources. Further, the investment hub system may accept automated holdings feeds for reconciliation purposes from various sources.

Returning again to FIG. 1, an administrative services module 140 may be configured to provide various online functionality via the investment hub system 105 including enabling maintenance of the fund master database and fund documents located in the data warehouse 110 via online input and document scanning/uploading. That module 140 may also be configured to support tracking and facilitating fund trades received by file from the client financial institution from receipt through settlement including monitoring work queues, reviewing/preparing appropriate trade application documents, initiating cash transfers, and communicating with client financial institutions regarding any issues.

The module 140 may further be configured to maintain contact information for fund administrators, investment managers, banking institutions and other parties involved in fund administration/cash settlement. The administrative services module 140 may also support independent computation of fund equalization factors on each fund valuation date, receipt and verification of the official equalization factors from fund administrators, and input of verified equalization units/adjustments into the investment hub system 105. Further, this module 140 may be configured to support viewing of fund holdings to ensure overall accuracy of fund status and values and preparing necessary internal or external reports as appropriate as well as receiving end of period fund statements and reconciling statement holdings to the corresponding holdings information on investment hub system 105 as well as initiating any adjustments, as necessary, on the investment hub system 105.

The FoHF pricing subsystem 150 may be configured to communicate with fund administrators and investment managers to receive the most recent fund final or estimated prices. In addition, the FoHF pricing subsystem 150 may also use external pricing data sources such as Bloomberg and Reuters to receive published fund prices. In each of those configurations, fund prices may be provided via manual input into the data warehouse 110 or by an automated feed from one or more systems or subsystems that are internal or external to the FoHF system 100.

In accordance with at least one embodiment of the invention, the investment hub system 105 may be configured to create a daily file extract containing any fund prices that have changed in data warehouse on that day and then send this file to one or more other FoHF subsystems, e.g., the FoHF pricing subsystem 150. Upon receipt, such a subsystem(s) may load the prices and then use the new prices to perform any fund valuation necessary for full fund administration (e.g., striking NAVs, etc.) and/or for formal client statement reporting. As necessary, such subsystem(s) may then also send official valued fund accounting positions back to the investment hub system for storage and online viewing from the data warehouse. These valued positions may include updated profit and loss information reflecting the latest price.

The investment hub system may further be configured to assist in fund pricing activities by providing a user interface that provides the ability to maintain and view existing price instructions for each fund on the investment hub system. Additional functionality may enable communicating with fund administrators and receiving final or estimated fund unit values by facsimile, telephone, electronic-mail, automated feeds, etc. Further, the investment hub system 105 may be configured to provide monitoring price reminder work lists to ensure the timely receipt and input of fund prices based upon previously entered price instructions and input of final and estimated prices upon receipt into the investment hub system 105, with review of any tolerance exceptions to ensure that fund prices are accurate. Additionally, the investment hub system 105 may enable initiation/review of stale price inquiries to further ensure the timeliness of fund prices.

As mentioned previously, in accordance with various embodiments, investment managers may communicate with the FoHF system via the client financial institution rather then directly with the FoHF system regarding fund trades. However, it should be understood that, in accordance with at least one other embodiment of the invention, the investment hub system may be implemented remotely at investment manager shops so that these managers are linked directly with the FoHF system. In such an implementation, one or more interfaces may be provided through which authorized investment managers may have online access to the FoHF system fund master database and to online fund search, trading, and reporting activities available over the Internet via the investment hub system.

Additionally, investment managers may be granted the ability to conduct an online, on-demand search of any of the manager's funds only by name, identifier, and/or characteristic and to view all the salient fund information and documents for the manager's authorized funds online as well as the ability to view a more limited amount of "public" information regarding a wider universe of FoHF system funds. Investment managers may also submit fund subscription, redemption, and transfer transactions for any of the manager's funds via online entry or by file submission to the FoHF system and to track the status of these pending trades through settlement; further, these managers may have the ability to query the settled and pending position in any fund of funds for a manager or across all funds for a manager including viewing the most recent unit value and total market value of fund positions and also the ability to run a cash forecast projecting cash settlement amounts taking into consideration pending subscriptions and redemptions for any fund of fund or across all funds for a manager.

As mentioned above, the investment hub system enables multiple systems and subsystems, both internal and external, to communicate with FoHF system electronically in a straight through manner. The investment hub system can accept input in any number of methods and formats including by file transfer and via interactive messaging. In accordance with embodiments that outsource only the back office functionality of a client financial institution, the only external input to the investment hub system for FoHF processing may need to be the TOF or an online transaction input described herein. Alternatively, the investment hub system may also accept additional inputs from other systems and subsystems from other sources, including possibly pricing and end of period holdings files from fund administrators. In addition, it may be useful to receive a feed of transactions and holdings from an official custody accounting system if the investment hub system 105 does not maintain the lot-level inventory records.

As mentioned above, the FoHF, and particularly the investment hub system 105, support monitoring the status of each trade throughout that trade's life cycle. Summary status by file and by trade with drill-down detail may be available online from the investment hub system browser desktop to authorized users.

In addition to tracking each pending trade throughout each step in its life cycle, the investment hub system may be configured to maintain an up-to-date online inventory of fund holdings. The fund inventory may be changed online as a result of certain workflow events. As a result, at all times, the most current fund position and its status may be viewable online by authorized staff. The updated fund holdings records may reflect the latest real-time changes in pending subscriptions and redemptions as well as providing the current settled fund positions incorporating the latest unit price for the fund. However, the investment hub system holdings inventory may not include the current cash balance for the client financial institution. That cash balance may be maintained and stored by another FoHF subsystem(s), which maintain cash balance records using trade-by-trade synchronization with the investment hub system.

For each fund, the investment hub system may maintain a unique record for each different subscription/acquisition in that fund called the lot inventory. Each lot inventory record is identified by a unique lot number as well as by the dealing date when the lot was acquired. In one potential implementation, individual lot inventory records may reflect the "bulked" subscriptions sent by the client financial institution to the FoHF system on the TOF and may not breakout individual acquisitions at the investment manager level. Each lot inventory record contains the status of that lot (e.g., pending, settled, etc.), the quantity held in that lot and/or the value of the lot denominated in a currency (when the units of the lot are not yet known), the nominee registration of the lot, an indicator to designate if the lot is restricted or encumbered, and other information detailing the lot. Lot inventory records may be updated automatically by the investment hub system at various points during the subscription and redemption life cycle so that the holdings are always up-to-date and in synch with the most current information available at each workflow stage.

Figure 7:
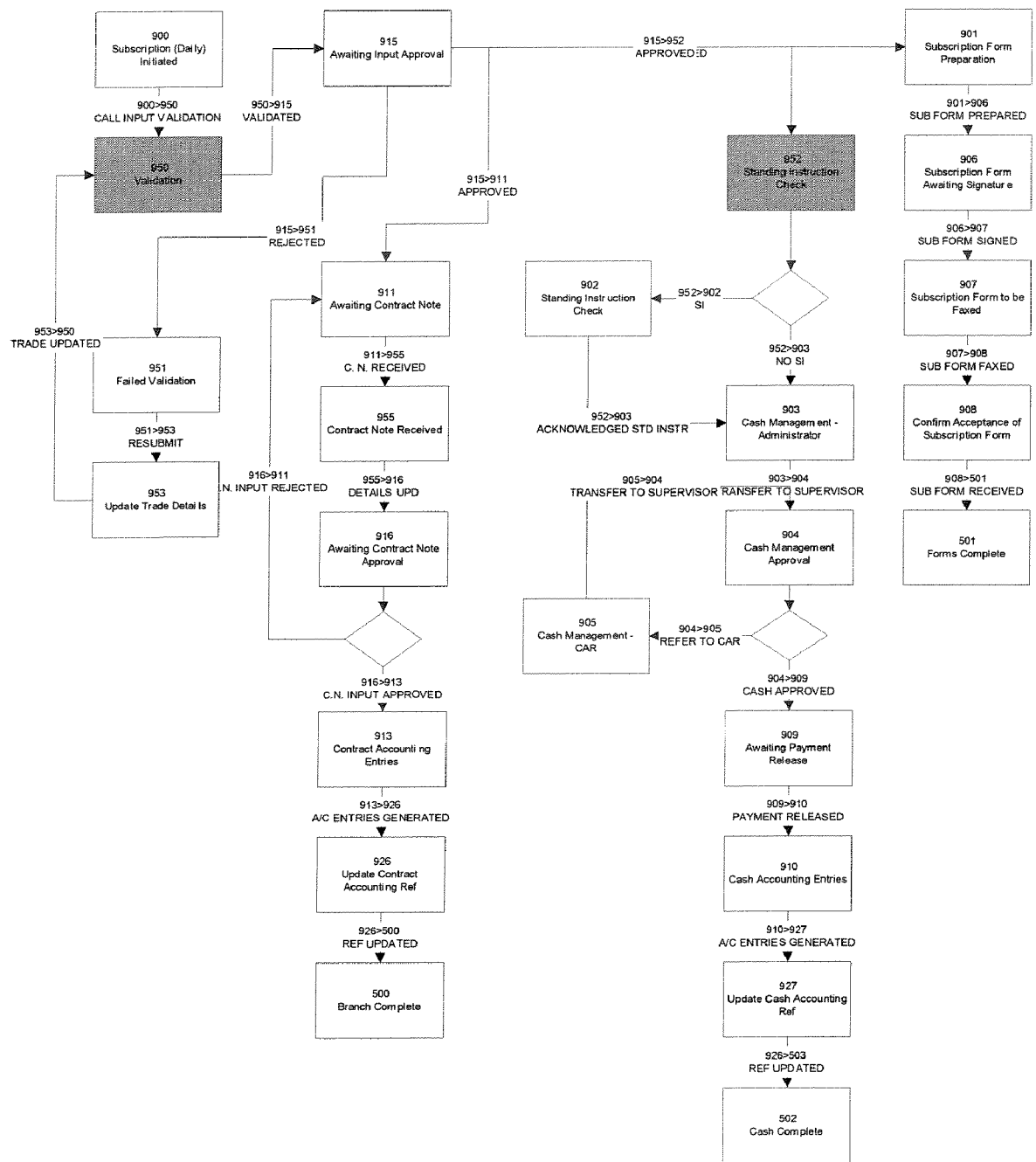
FIG. 7 illustrates one example of a daily subscription workflow.

For example, a new lot inventory record is created upon receipt/validation of a new subscription on a TOF. The lot inventory record has an initial status of "awaiting subscription form" (or some other similar pending status) and typically contains preliminary and incomplete financial information since the monetary value of the subscription is known but the quantity (i.e., units) of the lot is not known. At a later point in the workflow upon receipt of the contract note and upon entry of the subscription price and units in the investment hub system, the lot inventory record may be automatically updated to contain the quantity and unit price for the lot. The status of the lot may also be updated during its trade life cycle and designate if the lot has already settled or indicates the current step in the life cycle for the lot, if a trade is pending against the lot. At any time, it is also possible to link or navigate from an individual lot inventory record to the original trade/transaction that originally created that lot as well as to any subsequent transaction(s) (e.g. partial redemption, etc.) that have updated that lot. For each such transaction, it is also possible to retrace the individual work steps in the life cycle of that transaction so that a complete chronological history of that lot is available (assuming historical records have not been purged). FIG. 7 illustrates one example of a daily subscription workflow configured in accordance with at least one embodiment of the invention. The subscription workflow may be used to execute monthly subscription transactions, but in order to accommodate daily subscription transactions a new workflow may be required. Both the monthly and daily subscription workflows may begin with the completion and sending of the subscription application form to the underlying fund administrator/transfer agent or other appropriate identified personnel. It is at this point that the two workflows may differ in the sequencing of events. The next step in the monthly subscription workflow may involve the subscription money being moved to the underlying fund administrator/transfer agent, with the final step being the return receipt of a contract note confirming the transaction, i.e., it is now settled. The daily subscription workflow may differ in that the contract note may be received from the underlying fund administrator/transfer agent prior to sending the subscription money. Once the money is received and conformed by the underlying fund administrator/transfer agent, then the trade may be considered settled.

Figure 8:
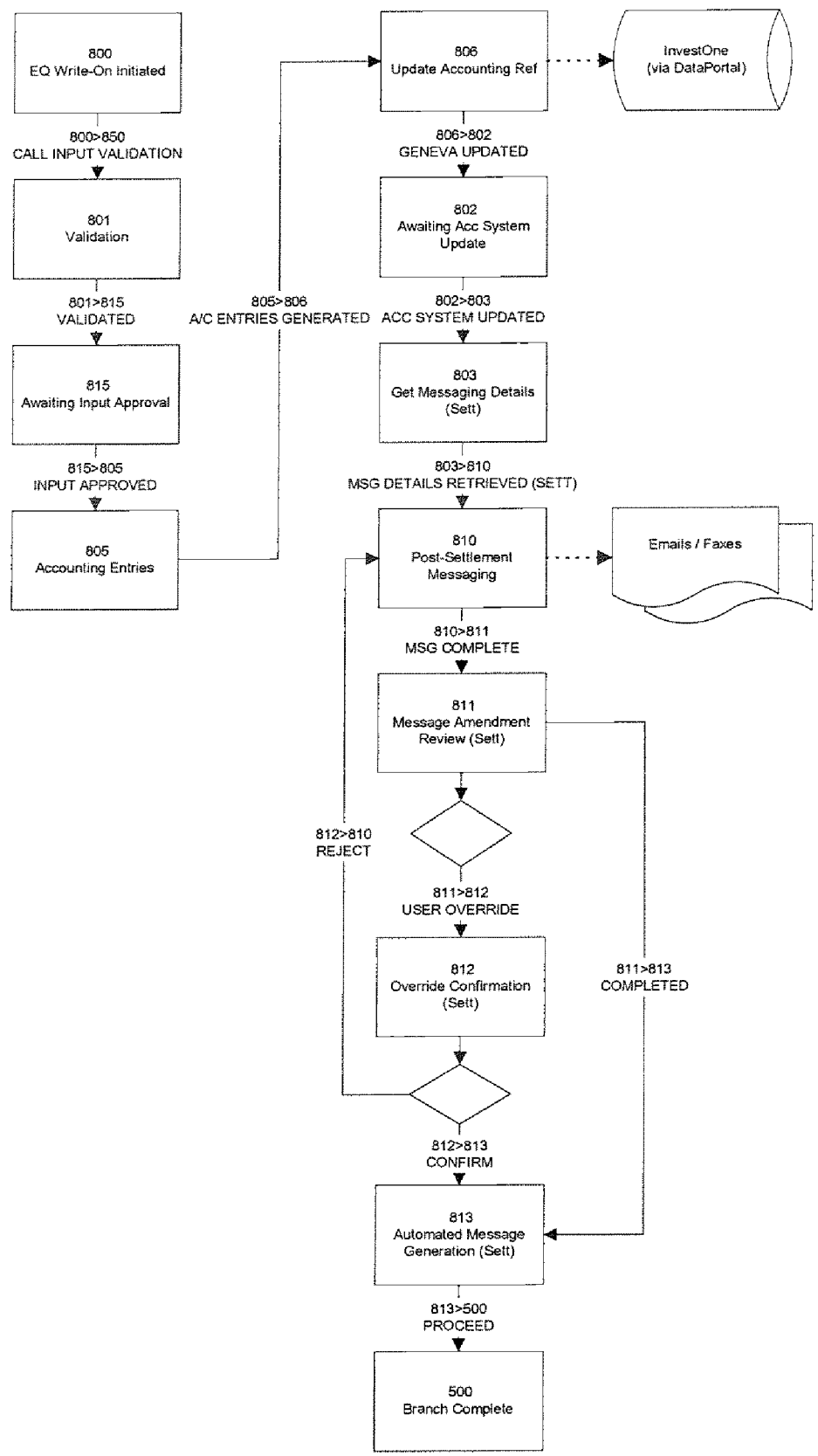
FIG. 8 illustrates one example of an equalization workflow.

FIG. 8 illustrates one example of one type of an equalization transaction workflow provided in accordance with at least one embodiment of the invention; another type of such a transaction is an equalization write-off transaction. These transactions accommodate the automated processing of equalization transactions and the crystallization of equalization credits at the end of a performance period. Equalization is a method of calculating performance in a hedge fund whereby the performance of the fund is tracked at an investor transaction lot level. Depending on whether the NAV per share price of the underlying fund at the time of subscription is above or below the fund high water mark, the underlying fund administrator/transfer agent may issue an Equalization Credit (EC) or else track an Additional Performance Fee (APF). At the end of the performance period, each investor who entered the fund during that performance period may either receive additional shares (EC) or else pay an APF through a forced redemption. In this way, each investor subscription is treated on an equitable basis.

The equalization write-on transaction occurs when an investor receives an EC from the underlying fund. The workflow does not require the completion of an application form or the movement of money. Instead the details of the transaction are received from the underlying administrator/transfer agent and are processed by the investor. The equalization write-off transaction occurs when an investor pays an APF and is forced to redeem shares. Again, there is no requirement to complete an application form or to move money. Instead the details of the transaction are received from the underlying administrator/transfer agent and are processed by the investor.

Figure 9:
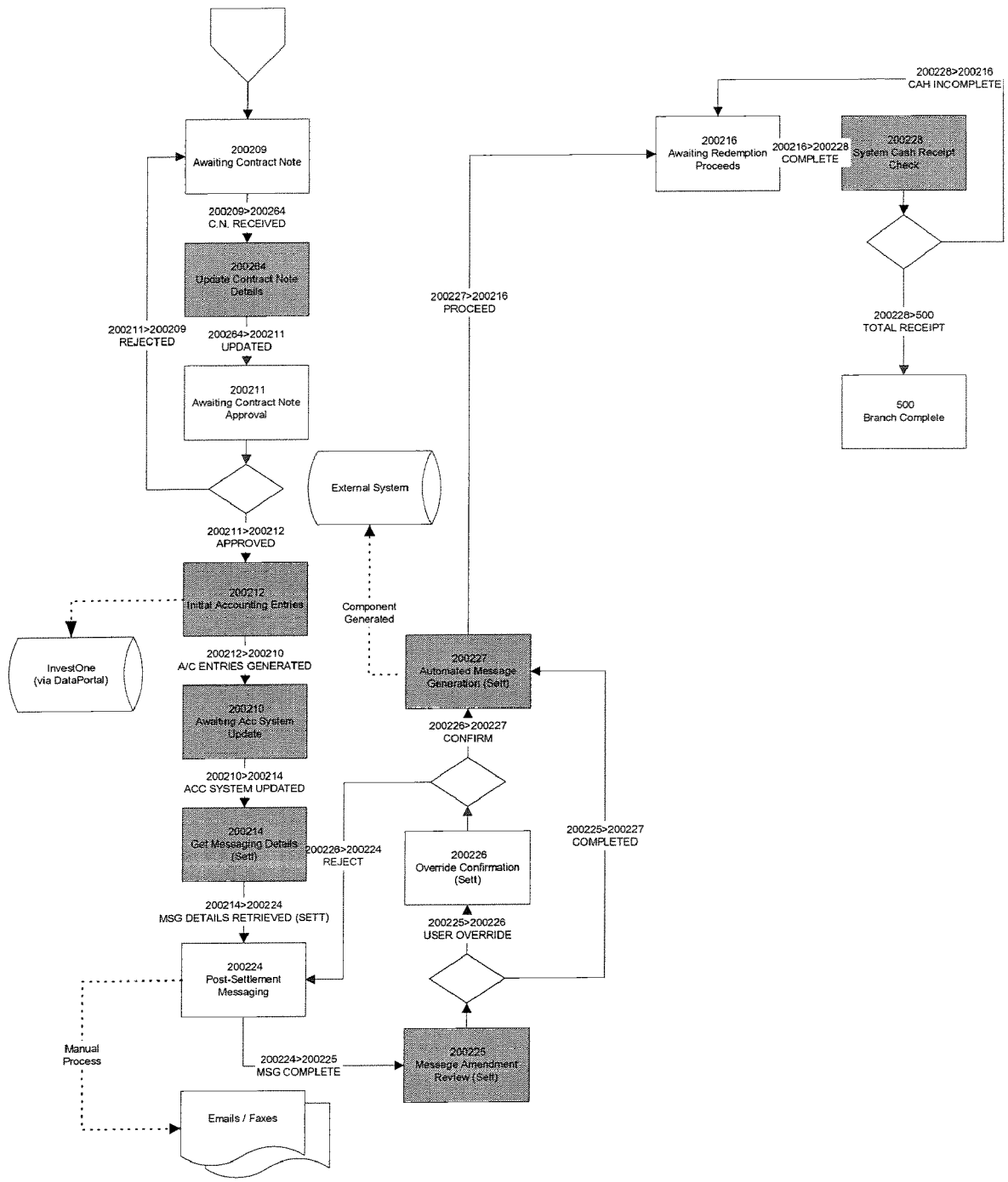
FIG. 9 illustrates one example of a redemption (tracking tail payments) workflow.

FIG. 9 illustrates one example of a redemption tail payment tracking workflow in accordance with at least one embodiment of the invention. The redemption workflow is configured to accommodate the tracking the receipt of split redemption proceeds from the underlying fund administrator/transfer agent. It is not uncommon for hedge funds to pay 95% of redemption proceeds within a 3-5 day period of the dealing date, with the remaining 5% being withheld for a period of time, i.e. the money may not be paid out for up to 90 days until the completion of an audit or the finalizing of the Fund NAV. The redemption transaction on the workflow may remain unsettled until 100% of the redemption proceeds are received. The workflow is capable of acknowledging partial receipt of redemption proceeds, and to track the expected amount and date of the remaining proceeds. Aside from this enhancement, the redemption workflow remains unchanged.

The investment hub system may also provide several additional new online posting and control inquiries/reports that may summarize the changes to the lot inventory records on a given day or over a designated time period in the past. The posting and control inquiries are available to internal the FoHF system staff for audit and control purposes.

While this invention has been described in conjunction with the specific embodiments outlines above, it is evident that many alternatives, modifications and variations will be apparent to those skilled in the art. Accordingly, embodiments of the invention, as set forth above, are intended to be illustrative, not limiting. Various changes may be made without departing from the spirit and scope of the invention.

What is claimed is:

1. A computer networked system for fund of hedge fund transaction processing and recordkeeping the system comprising:
an investment hub comprising a processor and a database in a data storage element configured to;
receive data included in an electronic trade order file received over a network,
execute a fund of hedge funds transaction associated with the received data,
update a lot-level holdings inventory for fund of hedge funds stored in the database as a by-product of the executed fund of hedge funds transactions;
an accounting subsystem operatively coupled to the investment hub and configured to:
update fund accounting records for a fund of hedge funds system client from a trade creation date to a trade settlement date, the fund accounting records including accounting data relating to the executed fund of hedge funds transaction and an investment position for the fund of hedge funds system client at a tax-lot level for the executed fund of hedge funds transaction:
transmit fund shareholder information including the updated fund accounting records from the trade creation date to the trade settlement date to the investment hub and store said fund shareholder information in the database; and
a user interface operatively coupled to the investment hub and configured to:
provide access to a user and communicate at least one of the lot-level holding inventory for the funds of hedge funds and the fund shareholder information including the updated fund accounting records from the trade creation date to the trade settlement date stored in the database over the user interface.

2. The system of claim 1, wherein the trade order file is received from a client financial institution on behalf of an investment manager.

3. The system of claim 1, wherein the trade order file is received from a client financial institution via an FTP site.

4. The system of claim 1, wherein the trade order file is received by the investment hub via an automated data feed over the network.

5. The system of claim 1, wherein the trade order file includes a plurality of trade orders bulked by the fund of hedge funds system client.

6. The system of claim 1, wherein the trade order file includes subscriptions and redemptions.

7. The system of claim 1, wherein the trade order file includes at least one of a transfer in and a transfer out.

8. The system of claim 1, further comprising a pricing subsystem coupled to the investment hub and configured to receive pricing information relating to the fund of hedge funds.

9. The system of claim 1, wherein the investment hub indicates, via the lot-level holdings inventory, an amount currently held or settled in each hedge fund included in the fund of hedge funds.

10. The system of claim 1, wherein the investment hub tracks real-time status of pending subscriptions and redemptions from creation to settlement via the lot-level holdings inventory.

11. The system of claim 1, wherein the user interface provides access to the lot-level holdings inventory.

12. The system of claim 1, wherein the investment hub and accounting subsystem are arranged so as to work in cooperation to perform an automated, computer-implemented work flow for electronically processing a subscription.

13. The system of claim 1, wherein the investment hub and accounting subsystem are arranged so as to work in cooperation to perform an automated, computer-implemented work flow for electronically processing a redemption.

14. The system of claim 1, wherein the investment hub and accounting subsystem are arranged so as to work in cooperation to perform an automated, computer-implemented work flow for electronically processing a transfer in.

15. The system of claim 1, wherein the investment hub and accounting subsystem are arranged so as to work in cooperation to perform an automated, computer-implemented work flow for electronically processing a transfer out.

16. A computer-implemented method for fund of hedge funds transaction processing and record keeping, the method comprising:
receiving, at an investment hub comprising a computer processor and a database in a data storage element, data included in an electronic trade order file received over a network;
executing, at the investment hub, a fund of hedge funds transaction associated with the received data;
updating, by the investment hub, a lot-level holdings inventory for the fund of hedge funds in the database as a by-product of the executed fund of hedge funds transaction;
updating, by an accounting subsystem operatively coupled to the investment hub fund accounting records for a fund of hedge funds system client from a trade creation date to trade settlement date the fund accounting records including accounting data relating to the executed fund of hedge funds transaction and an investment position for the fund of hedge funds system client at a tax-lot level for the executed fund of hedge funds transaction;
transmitting, by the accounting subsystem, fund shareholder information including updated fund accounting records from the trade creation date to the trade settlement date to the investment hub and storing said fund shareholder information in the database; and
providing access to a user via a user interface operatively coupled to the investment hub and communicating at least one of the lot-level holding inventory for the funds of hedge funds and the fund shareholder information including the updated fund accounting records from the trade creation date to the trade settlement date over the user interface.

17. The method of claim 16, further comprising receiving the trade order file from a client financial institution on behalf of at least one investment manager.

18. The method of claim 16, further comprising receiving the trade order file from a client financial institution via an FTP site.

19. The method of claim 18, wherein the FTP site is included within the fund of hedge funds system.

20. The method of claim 16, further comprising receiving the trade order file by the investment hub system via an automated data feed.

21. The method of claim 16, wherein the trade order file includes a plurality of trade orders bulked by the fund of hedge funds system client.

22. The method of claim 16, wherein the trade order file includes subscriptions and redemptions.

23. The method of claim 16, wherein the trade order filed includes at least one of a transfer in and a transfer out.

24. The method of claim 16, wherein the lot-level holdings inventory indicates an amount currently held or settled in each hedge fund included in the fund of hedge funds.

25. The method of claim 16, further comprising electronically tracking a real-time status of pending subscriptions and redemptions from creation to settlement via the lot-level holdings inventory.

26. The method of claim 16, further comprising electronically accessing the lot-level holdings inventory via the user interface.

27. The method of claim 16, further comprising processing a subscription via an automated, computer-implemented work flow.

28. The method of claim 16, further comprising processing a redemption via an automated, computer-implemented work flow.

29. The method of claim 16, further comprising processing a transfer in via an automated, computer-implemented work flow.

30. The method of claim 16, further comprising processing a transfer out via an automated, computer-implemented work flow.

* * * * *